United States Patent
Francis et al.

(10) Patent No.: US 9,483,477 B2
(45) Date of Patent: Nov. 1, 2016

(54) AUTOMATED DATA INTAKE SYSTEM

(71) Applicant: SAS Institute Inc., Cary, NC (US)

(72) Inventors: Leslie Madonna Francis, Cary, NC (US); Brian Oneal Miles, Cary, NC (US); Shrividya Sastry, Apex, NC (US); David Lee Kuhn, Cave Creek, AZ (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 14/868,666

(22) Filed: Sep. 29, 2015

(65) Prior Publication Data

US 2016/0210297 A1    Jul. 21, 2016

Related U.S. Application Data

(60) Provisional application No. 62/105,035, filed on Jan. 19, 2015.

(51) Int. Cl.
*G06F 17/30*    (2006.01)

(52) U.S. Cl.
CPC ... *G06F 17/30076* (2013.01); *G06F 17/30106* (2013.01); *G06F 17/301* (2013.01)

(58) Field of Classification Search
CPC .......... G06F 17/30076; G06F 17/301; G06F 17/30106
See application file for complete search history.

(56) References Cited

U.S. PATENT DOCUMENTS

| | | | |
|---|---|---|---|
| 5,511,186 A * | 4/1996 | Carhart | G06F 17/30566 |
| 6,208,990 B1 | 3/2001 | Suresh et al. | |
| 6,651,062 B2 | 11/2003 | Ghannam et al. | |
| 6,708,189 B1 * | 3/2004 | Fitzsimons | G06F 17/30569 |
| 7,058,615 B2 | 6/2006 | Yao | |
| 7,584,460 B2 * | 9/2009 | Broberg, III | G06F 17/50 716/135 |
| 8,291,505 B2 * | 10/2012 | Hursey | H04N 7/17318 726/27 |
| 8,527,561 B1 * | 9/2013 | Moody, II | G06F 17/30182 707/822 |
| 8,583,769 B1 * | 11/2013 | Peters | G06F 9/541 709/221 |
| 8,868,656 B2 * | 10/2014 | Van Wie | G06F 9/4443 709/205 |
| 8,935,281 B1 * | 1/2015 | Kale | G06F 17/30106 707/772 |
| 8,972,992 B2 | 3/2015 | Fletcher et al. | |
| 8,977,717 B2 | 3/2015 | Aarni et al. | |
| 8,978,036 B2 | 3/2015 | Fletcher et al. | |

(Continued)

OTHER PUBLICATIONS

Tribble, D. R., Filename Pattern Matching, Dr. Dobb's, Dec. 1, 1997, 13 pages, [retrieved on Aug. 26, 2016], Retrieved from the Internet: <URL:http://www.drdobbs.com/filename-pattern-matching/184403439?pgno=1>.*

(Continued)

*Primary Examiner* — Geoffrey St Leger
(74) *Attorney, Agent, or Firm* — Bell & Manning, LLC

(57) ABSTRACT

In a system automatically processing data from a first computing device for use on a second computing device, a registry file including a plurality of filename parameters is read. Each filename parameter identifies a matching filename pattern, an extract script indicator, and a read file indicator. The extract script indicator indicates an extract script for a file having a filename that matches the matching filename pattern. The read file indicator indicates how to read the file having the filename that matches the matching filename pattern. One parameter of the plurality of filename parameters is selected by matching a filename of a source file to the matching filename pattern of the one parameter. The associated extract script is selected and used to read data from the source file using the associated read file indicator and the read data is output to a different file and in a different format.

30 Claims, 11 Drawing Sheets

(56) References Cited

U.S. PATENT DOCUMENTS

| | | | | |
|---|---|---|---|---|
| 2001/0002470 | A1* | 5/2001 | Inohara | G06F 3/0613 |
| 2002/0171546 | A1* | 11/2002 | Evans | G06F 21/554 |
| | | | | 340/540 |
| 2003/0101167 | A1* | 5/2003 | Berstis | G06F 17/30067 |
| 2003/0163508 | A1* | 8/2003 | Goodman | G06F 8/67 |
| | | | | 718/100 |
| 2003/0172094 | A1* | 9/2003 | Lauria | G06F 17/30117 |
| 2004/0073570 | A1* | 4/2004 | Janakiraman | G06F 21/6254 |
| 2006/0025962 | A1* | 2/2006 | Ma | G06Q 10/10 |
| | | | | 702/182 |
| 2006/0248009 | A1* | 11/2006 | Hicks | G06Q 20/00 |
| | | | | 705/40 |
| 2007/0124547 | A1* | 5/2007 | Bedi | G06F 3/0613 |
| | | | | 711/154 |
| 2008/0005450 | A1* | 1/2008 | Bangalore | G06F 12/0246 |
| | | | | 711/103 |
| 2008/0162511 | A1* | 7/2008 | Theobald | G06F 17/30106 |
| 2008/0306987 | A1* | 12/2008 | Chen | G06F 11/1471 |
| 2009/0319785 | A1* | 12/2009 | Wang | G06F 21/10 |
| | | | | 713/165 |
| 2010/0088674 | A1* | 4/2010 | Della-Libera | G06F 17/2705 |
| | | | | 717/114 |
| 2011/0282894 | A1* | 11/2011 | Broussard | G06F 17/30106 |
| | | | | 707/769 |
| 2012/0109937 | A1 | 5/2012 | Liensberger et al. | |
| 2013/0198201 | A1* | 8/2013 | Fukuda | G06F 17/30321 |
| | | | | 707/741 |
| 2014/0280401 | A1* | 9/2014 | Arai | G06F 17/30076 |
| | | | | 707/827 |
| 2014/0337429 | A1 | 11/2014 | Asenjo et al. | |
| 2015/0039651 | A1 | 2/2015 | Kinsely et al. | |
| 2015/0040025 | A1 | 2/2015 | Deklich et al. | |
| 2015/0063129 | A1 | 3/2015 | Blasinski | |
| 2015/0205834 | A1* | 7/2015 | Keeton | G06F 17/301 |
| | | | | 707/714 |
| 2015/0356094 | A1* | 12/2015 | Gorelik | G06F 17/30076 |
| | | | | 707/748 |

OTHER PUBLICATIONS

Giger, K. et al., XPath filename expansion in a Unix shell, Proceedings of the 15th international conference on World Wide Web, 2006, pp. 863-864, [retrieved on Aug. 26, 2016], Retrieved from the Internet: <URL:http://dl.acm.org/>.*

* cited by examiner

```xml
<?xml version="1.0" encoding="windows-1252" ?>
<REGISTRY>
    <ENTRY>
        <INCOMING>supportcontent.json</INCOMING>
        <FREQ>x</FREQ>
        <TRIGGER_FILE_EXT>/TRIGGER_FILE_EXT>
        <TRIGGER_VAL_LOAD_FLG></TRIGGER_VAL_LOAD_FLG>
        <PARTITIONED>N</PARTITIONED>
        <RUN_TIME></RUN_TIME>
        <RUN_DAYS></RUN_DAYS>
        <RUN_MONTHS></RUN_MONTHS>
        <RUN_DOM></RUN_DOM>
        <LATE_ALERT_DUR></LATE_ALERT_DUR>
        <REPROCESS_FLG></REPROCESS_FLG>
        <MAX_DELAY></MAX_DELAY>
        <COMPRESSED_FLG></COMPRESSED_FLG>
        <EXTRACT_PGM></EXTRACT_PGM>
        <DATA_ENCRYPTION_FLG></DATA_ENCRYPTION_FLG>
        <TRIGGER_ENCRYPTION_FLG></TRIGGER_ENCRYPTION_FLG>
        <CONTENTS>
            <FILE>
                <FILEID>?</FILEID>
                <FILENAME>supportcontent.json</FILENAME>
                <DESCRIPTION>Sample Custom Extract</DESCRIPTION>
                <FILETYPE>custom</FILETYPE>
                <OVERWRITE_FLG>X</OVERWRITE_FLG>
                <DELIMITER></DELIMITER>
                <FIRSTOBS>1</FIRSTOBS>
                <EXTRACT_SCRIPT>custom_java_JSON_extract_example.sas</EXTRACT_SCRIPT>
                <INFILE_OPTIONS>supportcontent.json</INFILE_OPTIONS>
                <OUTPUT_TABLE>supportcontent_JSON</OUTPUT_TABLE>
                <PRE_PROCESS_SCRIPT></PRE_PROCESS_SCRIPT>
                <POST_PROCESS_SCRIPT>custom_java_record_cnt.sas</POST_PROCESS_SCRIPT>
            </FILE>
        </CONTENTS>
    </ENTRY>
</REGISTRY>
```

Fig. 9

AUTOMATED DATA INTAKE SYSTEM

CROSS-REFERENCE TO RELATED APPLICATIONS

The present application claims the benefit of 35 U.S.C. §119(e) to U.S. Provisional Patent Application No. 62/105,035 filed Jan. 19, 2015, the entire contents of which are hereby incorporated by reference.

BACKGROUND

Hosted systems provide a way for customers to benefit from the value of software without the burden of infrastructure setup, support, and monitoring. One of the biggest hurdles of hosting is the transfer and intake of data into a hosted environment. Customers typically perform many steps such as decryption of the data, decompression of the data, extraction of the data for use, and movement/registration to make the data accessible to the hosted tools for use by the customers.

SUMMARY

In an example embodiment, a computer-readable medium that automatically processes data received from a first computing device for use in a different format on a second computing device is provided. The computer-readable medium has stored thereon computer-readable instructions that when executed by a computing device, cause the computing device to support the automatic processing. A registry file is automatically read. The registry file includes a plurality of filename parameters, wherein each filename parameter of the plurality of filename parameters identifies a matching filename pattern. An extract script indicator and a read file indicator are associated with each filename parameter. The extract script indicator indicates an extract script for a file having a filename that matches the matching filename pattern. The read file indicator indicates how to read the file having the filename that matches the matching filename pattern. Whether unprocessed source data is stored in a predefined directory is automatically determined. Based upon determining that unprocessed source data is stored in the predefined directory, a source file is automatically selected from the unprocessed source data; one parameter of the plurality of filename parameters read from the registry file is automatically selected by matching a filename of the selected source file to the matching filename pattern of the one parameter; an extract script is automatically selected based on the extract script indicator associated with the selected one parameter; data from the selected source file is automatically read using the selected extract script and using the read file indicator associated with the selected one parameter; and the read data is automatically output to a different file than the source file and in a different format than a format used in the source file.

In another example embodiment, a system is provided. The system includes, but is not limited to, a processor and a computer-readable medium operably coupled to the processor. The computer-readable medium has instructions stored thereon that, when executed by the processor, cause the system to automatically process data received from a first computing device for use in a different format on a second computing device.

In yet another example embodiment, a method of automatically processing data received from a first computing device for use in a different format on a second computing device is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 9 depicts a content of a default custom registry file in accordance with an illustrative embodiment.

DETAILED DESCRIPTION

Figure 1:
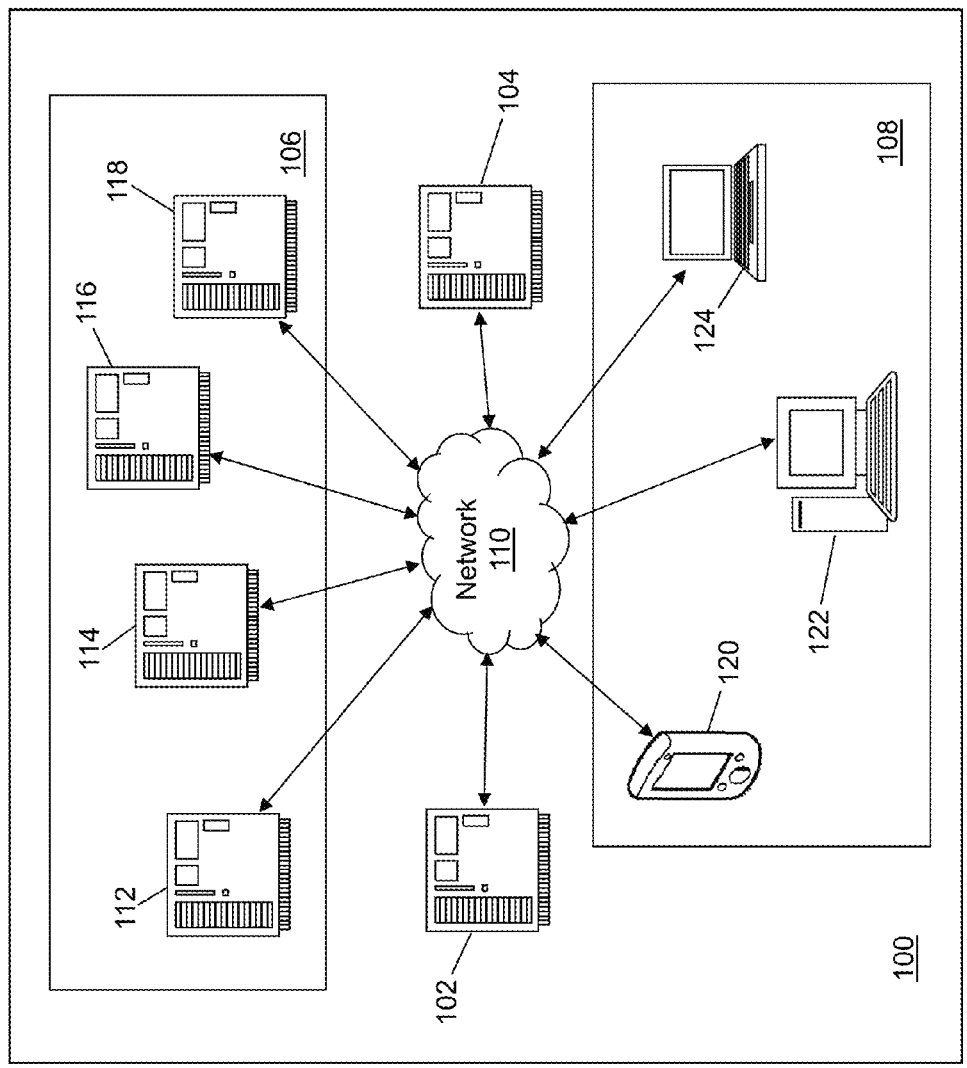
FIG. 1 depicts a block diagram of a data intake system in accordance with an illustrative embodiment.

Referring to FIG. 1, a block diagram of a data intake system 100 is shown in accordance with an illustrative embodiment. In an illustrative embodiment, data intake system 100 may include a data source device 102, a data intake device 104, hosted data system 106, data access system 108, and a network 110. Data source device 102 provides source data to data intake device 104. In an illustrative embodiment, data intake device 104 receives the source data and automatically processes the source data into a hosted environment supported by hosted data system 106. One or more computing device of data access system 108 may access the data stored in the hosted environment. For example, hosted data system 106 may provide analytic results from the data to a user of data access system 108 requesting access to the hosted data.

The source data sent from data source device 102 may be generated by a sensor, may be generated or captured in response to occurrence of an event or a transaction such as a sale of a product or a service, may be generated by a device such as in response to an interaction by a user with the device, etc. As used herein, the source data may include any type of content represented in any computer-readable format such as binary, alphanumeric, numeric, string, markup language, etc. The source data may be organized using delimited fields, comma separated fields, fixed width fields, using a SAS® dataset, etc. The SAS dataset may be a SAS® file stored in a SAS® library that a SAS® software tool creates and processes. The SAS data set contains data values that are organized as a table of observations (rows) and variables (columns) that can be processed by one or more SAS software tools. Example SAS software tools include Base SAS, SAS® LASR™, SAS®/CONNECT, SAS® Scalable Performance Data Engine, SAS® Metadata, SAS® Visual Analytics, all of which are developed and provided by SAS Institute Inc. of Cary, N.C., USA. The content of the source data may include textual information, graphical information, image information, audio information, numeric information, etc. that further may be encoded using various encoding techniques as understood by a person of skill in the art.

Each of data source device 102, data intake device 104, hosted data system 106, and data access system 108 may be composed of one or more discrete devices in communication through network 110. For example, hosted data system 106 may implemented as a series of blades as understood by a person of skill in the art. Hosted data system 106 and data intake device 104 may communicate using a message passing interface (MPI), which is a language-independent communications protocol that may be used to program communication between parallel computers such as hosted data system 106. Either or both of point-to-point and collective communication may be supported by the MPI. Hosted data system 106 and data intake device 104 may be configured similarly in terms of both software and hardware though this may or may not be required. In an alternative embodiment, hosted data system 106 and data intake device 104 may be implemented in the same computing device, may be integrated, or may be separate systems.

Hosted data system 106 may perform an analytic task on the hosted data that is created from the source data and that is stored in memory accessible by hosted data system 106. Hosted data system 106 may return the results to data access system 108. In addition, hosted data system 106 may ensure that the source data sent from data source device 102 is well-formatted for analytic use and is maintained. Data maintenance may include appending new, unprocessed data to an existing data set and expiring data after it is no longer required.

Network 110 may include one or more networks of the same or different types. Network 110 can be any type of wired and/or wireless public or private network including a cellular network, a local area network, a wide area network such as the Internet, etc. Network 110 further may comprise sub-networks and consist of any number of devices.

Though referenced as a device, data source device 102 may include one or more integrated computing devices that may be organized into subnets. Data source device 102 may include any number and any combination of form factors of computing devices such as a laptop, a desktop, a smart phone, a personal digital assistant, an integrated messaging device, a tablet computer, etc. For illustration, FIG. 1 represents data source device 102 as a server computer. In general, a server computer may include faster processors, additional processors, more disk memory, and more random access memory (RAM) than a client computer as understood by a person of skill in the art. Source device 102 sends and receives signals through network 110 to/from data intake device 104. Data source device 102 may communicate using various transmission media that may be wired and/or wireless as understood by those skilled in the art.

Figure 2:
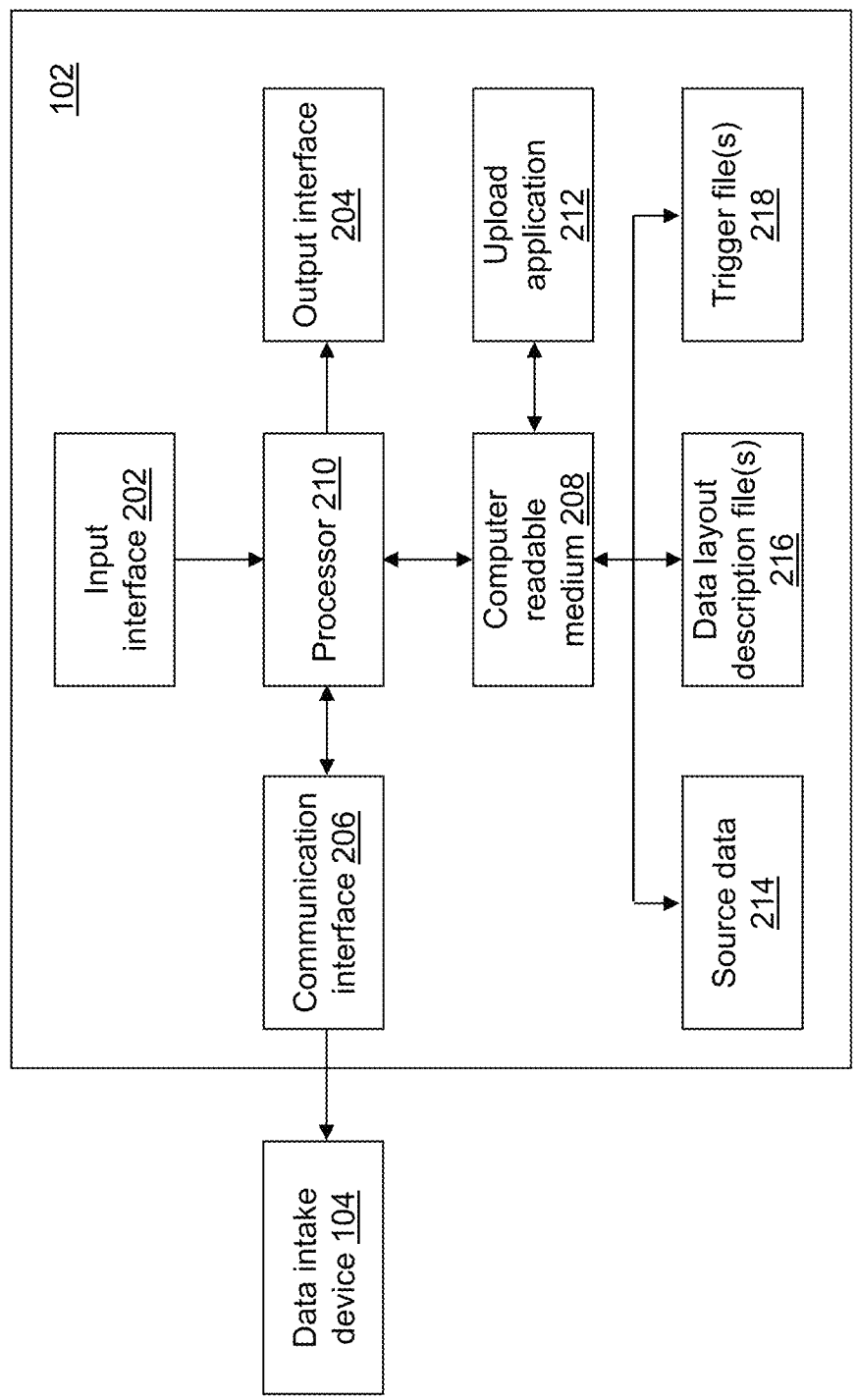
FIG. 2 depicts a block diagram of a data source device of the data intake system of FIG. 1 in accordance with an illustrative embodiment.

Referring to FIG. 2, a block diagram of data source device 102 is shown in accordance with an illustrative embodiment. Data source device 102 may include an input interface 202, an output interface 204, a communication interface 206, a computer-readable medium 208, a processor 210, an upload application 212, source data 214, one or more data layout description files 216, and one or more trigger files 218. Fewer, different, and additional components may be incorporated into data source device 102.

Input interface 202 provides an interface for receiving information from the user for entry into data source device 102 as understood by those skilled in the art. Input interface 202 may interface with various input technologies including, but not limited to, a keyboard, a mouse, a display, a track ball, a keypad, one or more buttons, etc. to allow the user to enter information into data source device 102 or to make selections presented in a user interface displayed on the display. The same interface may support both input interface 202 and output interface 204. For example, a display comprising a touch screen both allows user input and presents output to the user. Data source device 102 may have one or more input interfaces that use the same or a different input interface technology. The input interface technology further may be accessible by data source device 102 through communication interface 206.

Output interface 204 provides an interface for outputting information for review by a user of data source device 102. For example, output interface 204 may interface with various output technologies including, but not limited to, the display, a speaker, a printer, etc. Data source device 102 may have one or more output interfaces that use the same or a different interface technology. The output interface technology further may be accessible by data source device 102 through communication interface 206.

Communication interface 206 provides an interface for receiving and transmitting data between devices using various protocols, transmission technologies, and media as understood by those skilled in the art. Communication interface 206 may support communication using various transmission media that may be wired and/or wireless. Data source device 102 may have one or more communication interfaces that use the same or a different communication interface technology. For example, data source device 102 may support communication using an Ethernet port, a Bluetooth antenna, a telephone jack, a USB port, etc. Data and messages may be transferred between data source device 102 and data intake device 104 using communication interface 206.

Computer-readable medium 208 is an electronic holding place or storage for information so the information can be accessed by processor 210 as understood by those skilled in the art. Computer-readable medium 208 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Data source device 102 may have one or more computer-readable media that use the same or a different memory media technology. Data source device 102 also may have one or more drives that support the loading of a memory media such as a CD or DVD, an external hard drive, etc. One or more external hard drives further may be connected to data source device 102 using communication interface 206.

Processor 210 executes instructions as understood by those skilled in the art. The instructions may be carried out by a special purpose computer, logic circuits, or hardware circuits. Processor 210 may be implemented in hardware and/or firmware. Processor 210 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 210 operably couples with input interface 202, with output interface 204, with communication interface 206, and with computer-readable medium 208 to receive, to send, and to process information. Processor 210 may retrieve a set of instructions from a permanent memory device and copy the instructions in an executable form to a temporary memory device that is generally some form of RAM. Data source device 102 may include a plurality of processors that use the same or a different processing technology.

Upload application 212 performs operations associated with uploading source data 214 to data intake device 104. Upload application 212 may further perform operations associated with uploading the one or more data layout description files 216 and the one or more trigger files 218 to data intake device 104. The operations may be implemented using hardware, firmware, software, or any combination of these methods. Referring to the example embodiment of FIG. 2, upload application 212 is implemented in software (comprised of computer-readable and/or computer-executable instructions) stored in a tangible, non-transitory computer-readable medium 208 and accessible by processor 210 for execution of the instructions that embody the operations of upload application 212. Upload application 212 may be written using one or more programming languages, assembly languages, scripting languages, etc.

Upload application 212 may be implemented as a Web application. For example, upload application 212 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed, for example, may be a simple text file, an image file, an audio file, a video file, an executable, a common gateway interface application, a Java applet, an extensible markup language (XML) file, or any other type of file supported by HTTP. For illustration, Upload application 212 may be implemented as a file transfer protocol (FTP) upload, a secure FTP (SFTP) upload, a Web upload, etc.

Figure 3:
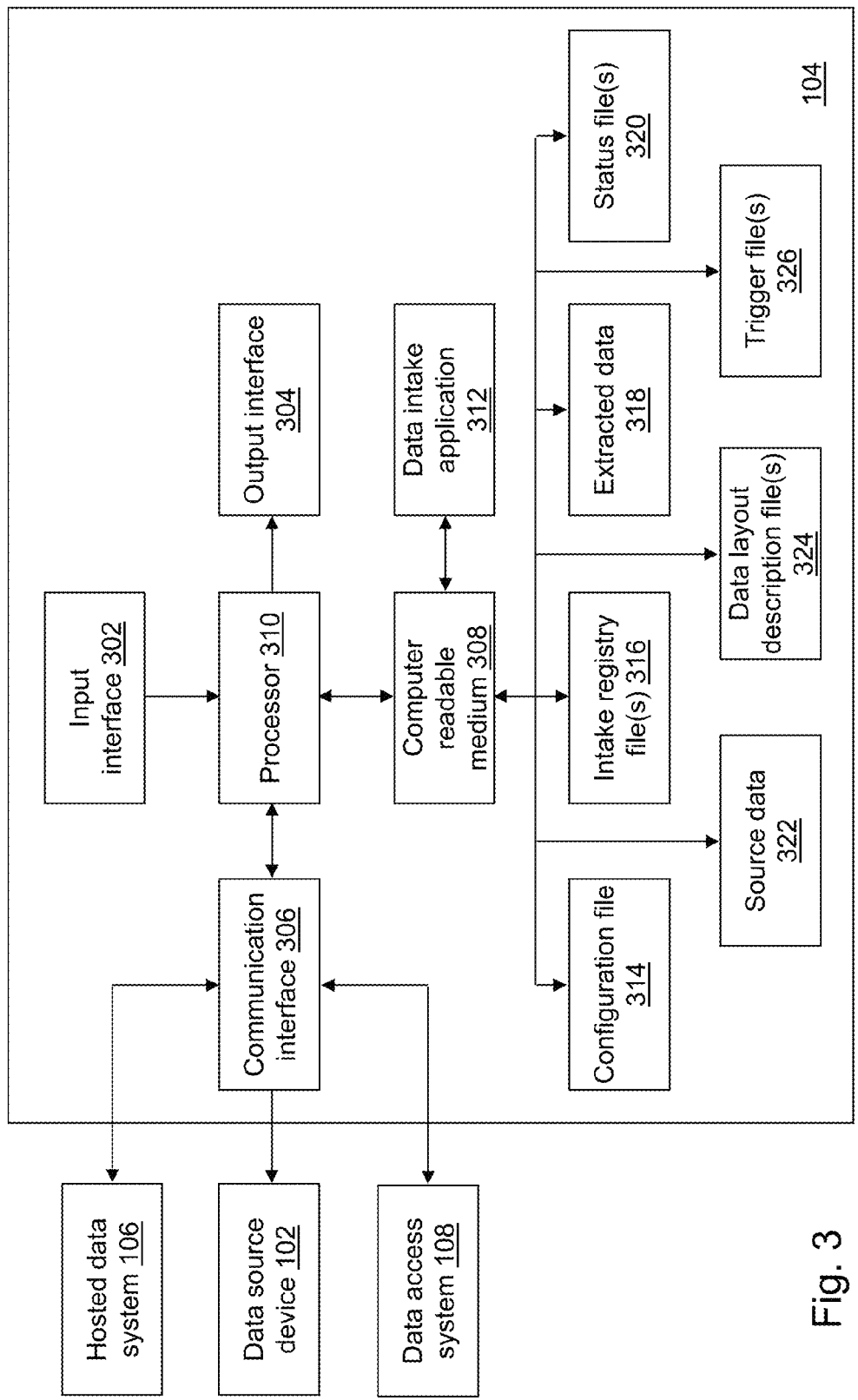
FIG. 3 depicts a block diagram of a data intake device of the data intake system of FIG. 1 in accordance with an illustrative embodiment.

Referring to FIG. 3, a block diagram of data intake device 104 is shown in accordance with an example embodiment. Though referenced as a device, data intake device 104 may include one or more integrated computing devices that may be organized into subnets. Data intake device 104 may include any number and any combination of form factors of computing devices such as a laptop, a desktop, a smart phone, a personal digital assistant, an integrated messaging device, a tablet computer, a wearable device, etc. For illustration, FIG. 1 represents data intake device 104 as a server computer. Data intake device 104 may include a second input interface 302, a second output interface 304, a second communication interface 306, a second computer-readable medium 308, a second processor 310, source data 322, one or more data layout description files 324, one or more trigger files 326, a data intake application 312, a configuration file 314, one or more intake registry files 316, extracted data 318, and one or more status files 320. Fewer, different, and additional components may be incorporated into data intake device 104. Extracted data 318 may be distributed to hosted data system 106 instead of or in addition to storage in second computer-readable medium 308.

Source data 322 stored in second computer-readable medium 308 may be a copy of source data 214 stored in computer-readable medium 208 after receipt from data source device 102. The one or more data layout description files 324 stored in second computer-readable medium 308 may be a copy of the one or more data layout description files 216 stored in computer-readable medium 208 after receipt from data source device 102. The one or more trigger files 326 stored in second computer-readable medium 308 may be a copy of the one or more trigger files 218 stored in computer-readable medium 208 after receipt from data source device 102.

Second input interface 302 provides the same or similar functionality as that described with reference to input interface 202 of data source device 102 though referring to data intake device 104. Second output interface 304 provides the same or similar functionality as that described with reference to output interface 204 of data source device 102 though referring to data intake device 104. Second communication interface 306 provides the same or similar functionality as that described with reference to communication interface 206 of data source device 102 though referring to data intake device 104. Data and messages may be transferred between data intake device 104 and data source device 102, hosted data system 106, and/or data access system 108 using second communication interface 306. Second computer-readable medium 308 provides the same or similar functionality as that described with reference to computer-readable medium 208 of data source device 102 though referring to data intake device 104. Second processor 310 provides the same or similar functionality as that described with reference to processor 210 of data source device 102 though referring to data intake device 104.

Data intake application 312 performs operations associated with processing source data 322 into extracted data 318 that may be labeled hosted data and that is accessible by data access system 108 using hosted data system 106. Data intake application 312 may use information contained in the one or more data layout description files 324, the one or more trigger files 326, configuration file 314, and the one or more intake registry files 316 to convert source data 214 to extracted data 318. Data intake application 312 may write status data to the one or more status files 320 to maintain an audit trail and log associated with the status of the processing.

Referring to the example embodiment of FIG. 3, data intake application 312 is implemented in software (comprised of computer-readable and/or computer-executable instructions) stored in second tangible, non-transitory computer-readable medium 308 and accessible by second processor 310 for execution of the instructions that embody the operations of data intake application 312. Data intake application 312 may be written using one or more programming languages, assembly languages, scripting languages, etc. Data intake application 312 may be implemented as a Web application.

Referring again to FIG. 1, data access system 108 may include one or more computing devices that may be organized into subnets. Data access system 108 may include any number and any combination of form factors of computing devices such as a laptop 120, a desktop 122, a smart phone 124, a personal digital assistant, an integrated messaging device, a tablet computer, etc.

Figure 4:
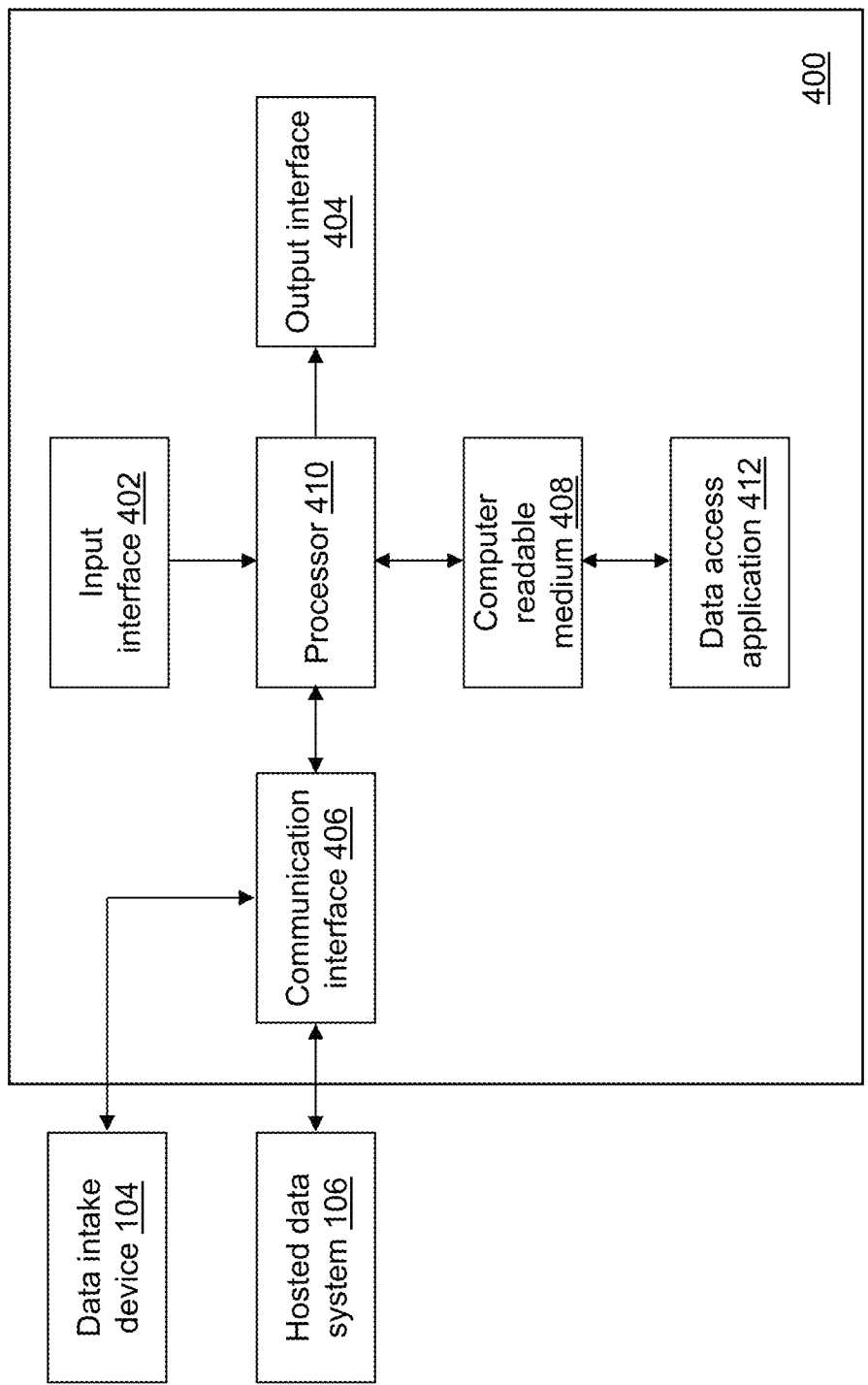
FIG. 4 depicts a block diagram of a data access device of the data intake system of FIG. 1 in accordance with an illustrative embodiment.

Referring to FIG. 4, a block diagram of a data access device 400 of data access system 108 is shown in accordance with an example embodiment. Data access device 400 is an example computing device of data access system 108. Data access device 400 may include a third input interface 402, a third output interface 404, a third communication interface 406, a third computer-readable medium 408, a third processor 410, and a data access application 412. Fewer, different, and additional components may be incorporated into data access device 400.

Third input interface 402 provides the same or similar functionality as that described with reference to input interface 202 of data source device 102 though referring to data access device 400. Third output interface 404 provides the same or similar functionality as that described with reference to output interface 204 of data source device 102 though referring to data access device 400. Third communication interface 406 provides the same or similar functionality as that described with reference to communication interface 206 of data source device 102 though referring to data access device 400. Data and messages may be transferred between data access device 400 and data intake device 104 and/or hosted data system 106 using third communication interface 406. Third computer-readable medium 408 provides the same or similar functionality as that described with reference to computer-readable medium 208 of data source device 102 though referring to data access device 400. Third processor 410 provides the same or similar functionality as that described with reference to processor 210 of data source device 102 though referring to data access device 400.

Data access application 412 performs operations associated with accessing (i.e., querying, adding to, deleting from, modifying) extracted data 318 that may be stored at data intake device 104 and/or hosted data system 106. For illustration, data access application 412 may provide analysis, visualization, or other processing of extracted data 318 depending on the content of extracted data 318 as understood by a person of skill in the art.

Referring to the example embodiment of FIG. 4, data access application 412 is implemented in software (comprised of computer-readable and/or computer-executable instructions) stored in third computer-readable medium 408 and accessible by third processor 410 for execution of the instructions that embody the operations of data access application 412. Data access application 412 may be written using one or more programming languages, assembly languages, scripting languages, etc. Data access application 412 may be implemented as a Web application.

Referring again to FIG. 1, hosted data system 106 may include one or more computing devices that may be organized into subnets. Hosted data system 106 may include any number and any combination of form factors of computing devices. For illustration, FIG. 1 represents hosted data system 106 with a first server computer 112, a second server computer 114, a third server computer 116, and a fourth server computer 118. The computing devices of hosted data system 106 send and receive signals through network 110 to/from another of the one or more computing devices of hosted data system 106, to/from data intake device 104, and/or to/from data access system 108. The one or more computing devices of hosted data system 106 may communicate using various transmission media that may be wired and/or wireless as understood by those skilled in the art. For illustration, hosted data system 106 may implement a multi-node Hadoop® cluster, form a grid of computers storing extracted data 318 as a cube of data, implement a plurality of cloud computers using cloud computing to store extracted data 318, implement the SAS® LASR™ Analytic Server that loads extracted data 318 into an in-memory server, implement another type of SAS server solution, implement another hosted data solution offered by another vendor such as the SAP Hana Cloud Platform offered by SAP SE headquartered in Walldorf, Germany, Oracle® Database In-Memory offered by Oracle Corporation of Redwood Shores, Calif., USA, implement another type of in-memory server, a data store, data lake, etc.

Figure 5:
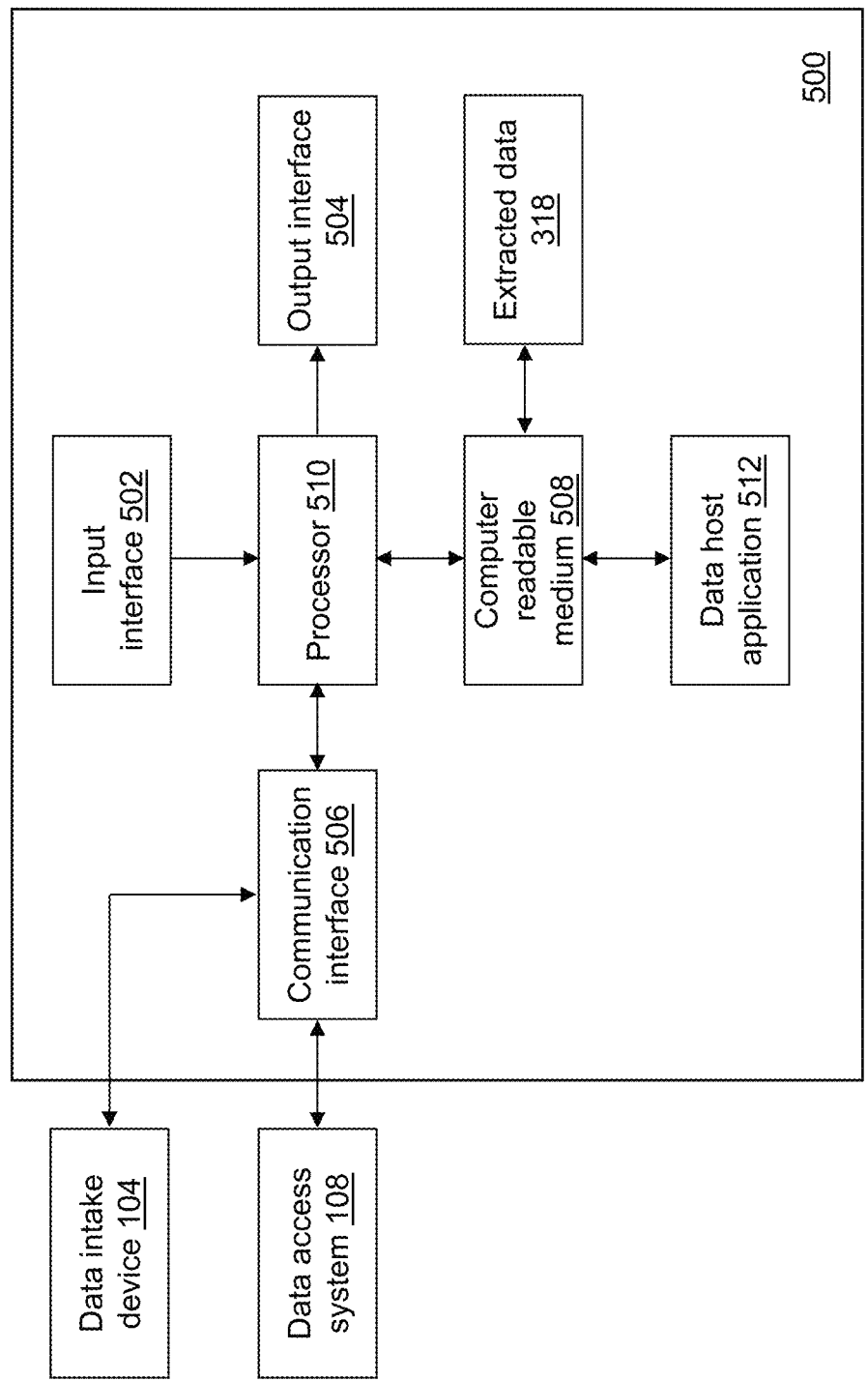
FIG. 5 depicts a block diagram of a data host device of the data intake system of FIG. 1 in accordance with an illustrative embodiment.

Referring to FIG. 5, a block diagram of a data host device 500 of hosted data system 106 is shown in accordance with an example embodiment. Data host device 500 is an example computing device of hosted data system 106. Data host device 500 may include a fourth input interface 502, a fourth output interface 504, a fourth communication interface 506, a fourth computer-readable medium 508, a fourth processor 510, and a data host application 512. Fewer, different, and additional components may be incorporated into data host device 500.

Fourth input interface 502 provides the same or similar functionality as that described with reference to input interface 202 of data source device 102 though referring to data host device 500. Fourth output interface 504 provides the same or similar functionality as that described with reference to output interface 204 of data source device 102 though referring to data host device 500. Fourth communication interface 506 provides the same or similar functionality as that described with reference to communication interface 206 of data source device 102 though referring to data host device 500. Data and messages may be transferred between data host device 500 and data intake device 104 and/or data access system 108 using fourth communication interface 506. Fourth computer-readable medium 508 provides the same or similar functionality as that described with reference to computer-readable medium 208 of data source device 102 though referring to data host device 500. Fourth processor 510 provides the same or similar functionality as that described with reference to processor 210 of data source device 102 though referring to data host device 500.

Data host application 512 performs operations associated with supporting access (i.e., querying, adding to, deleting from, modifying) to extracted data 318 by a computing device, such as data access device 400, of data access system 108. For illustration, data host application 512 may provide analysis, visualization, or other processing of extracted data 318 depending on the content of extracted data 318 as understood by a person of skill in the art.

Referring to the example embodiment of FIG. 5, data host application 512 is implemented in software (comprised of computer-readable and/or computer-executable instructions) stored in fourth computer-readable medium 508 and accessible by fourth processor 510 for execution of the instructions that embody the operations of data host application 512. Data host application 512 may be written using one or more programming languages, assembly languages, scripting languages, etc. Data host application 512 may be implemented as a Web application.

Figure 6A:
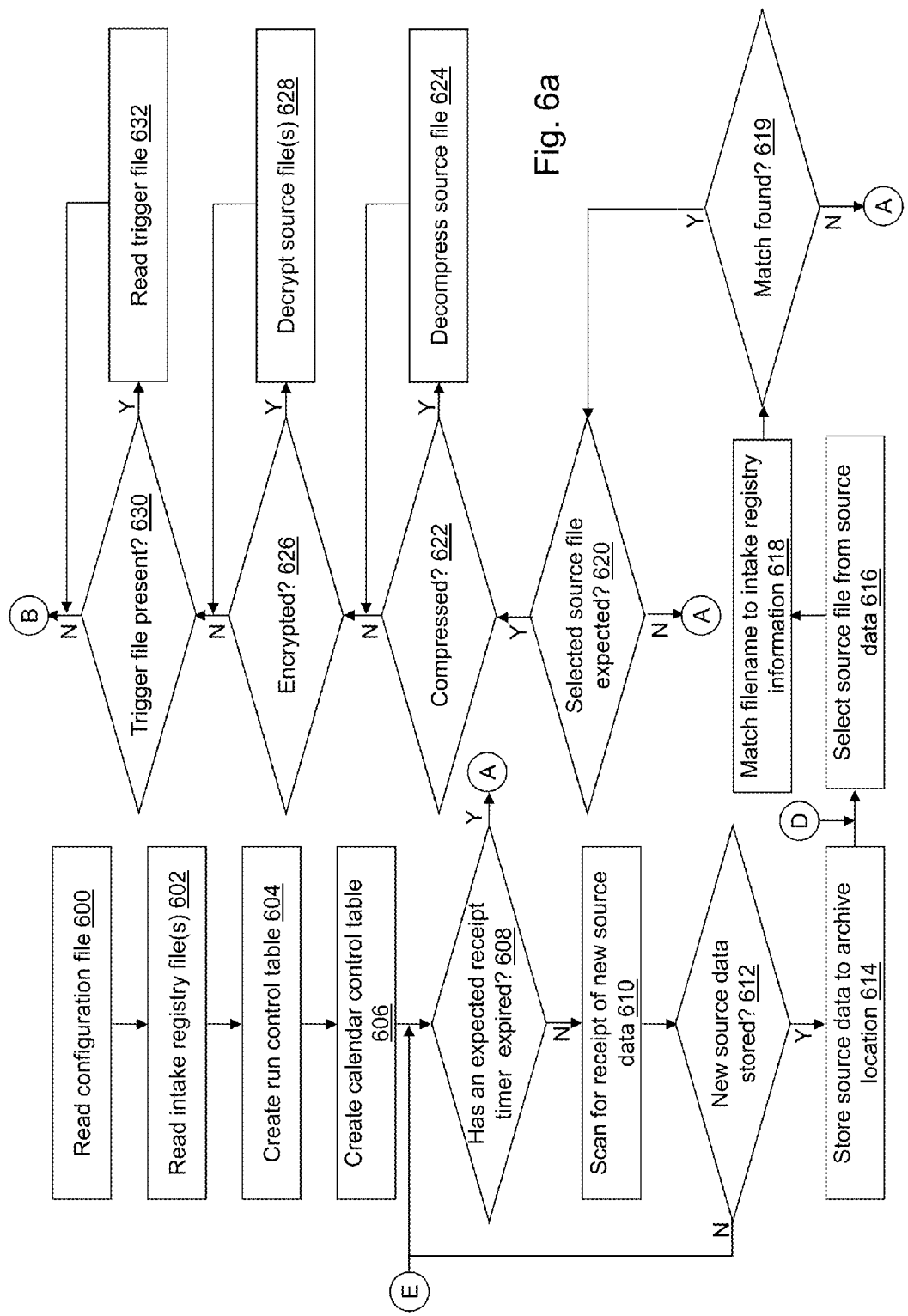
FIGS. 6a, 6b, and 6c depict a flow diagram illustrating examples of operations performed by the intake device of the data intake system of FIG. 1 in accordance with an illustrative embodiment.
Figure 6B:
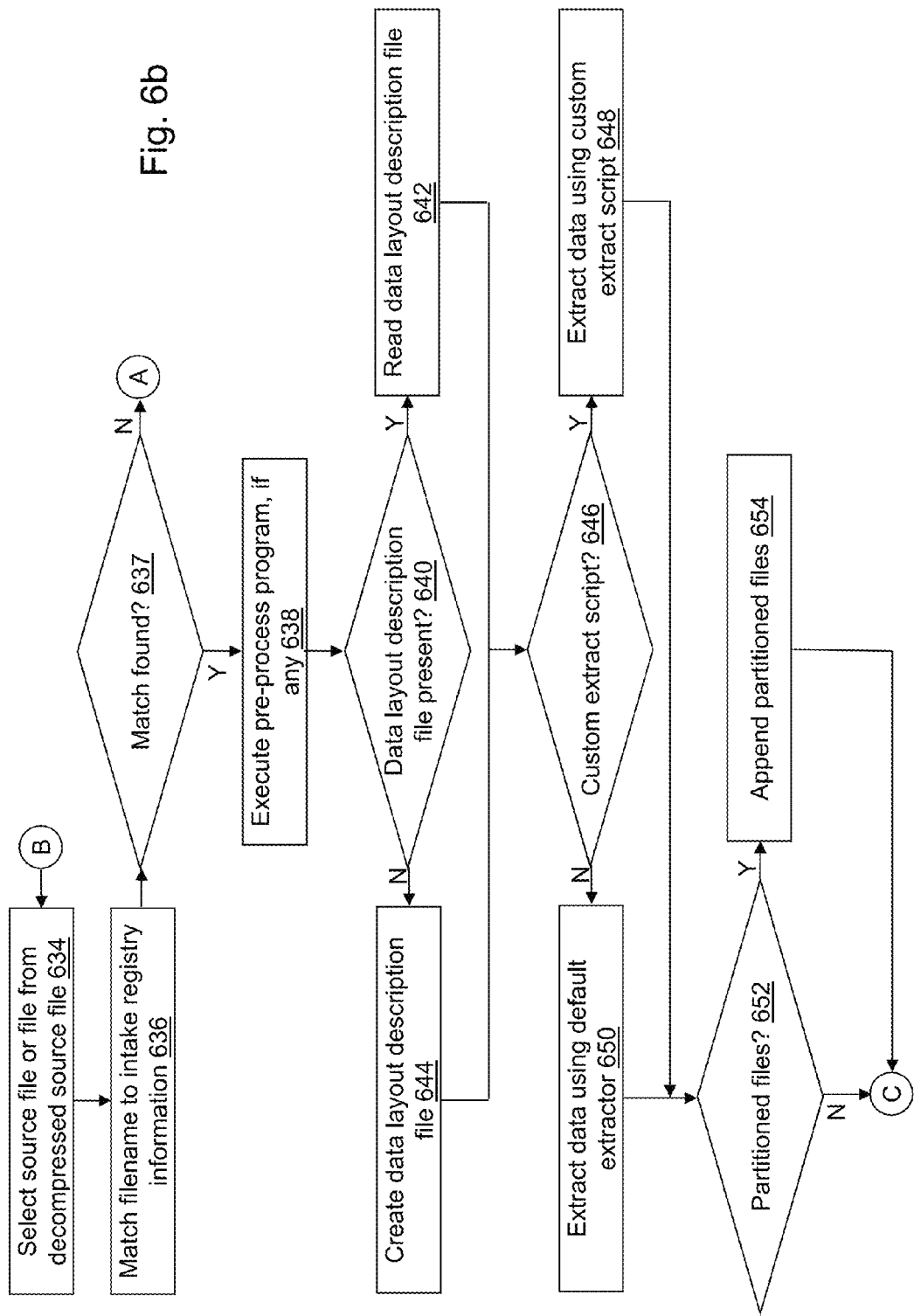
Figure 6C:
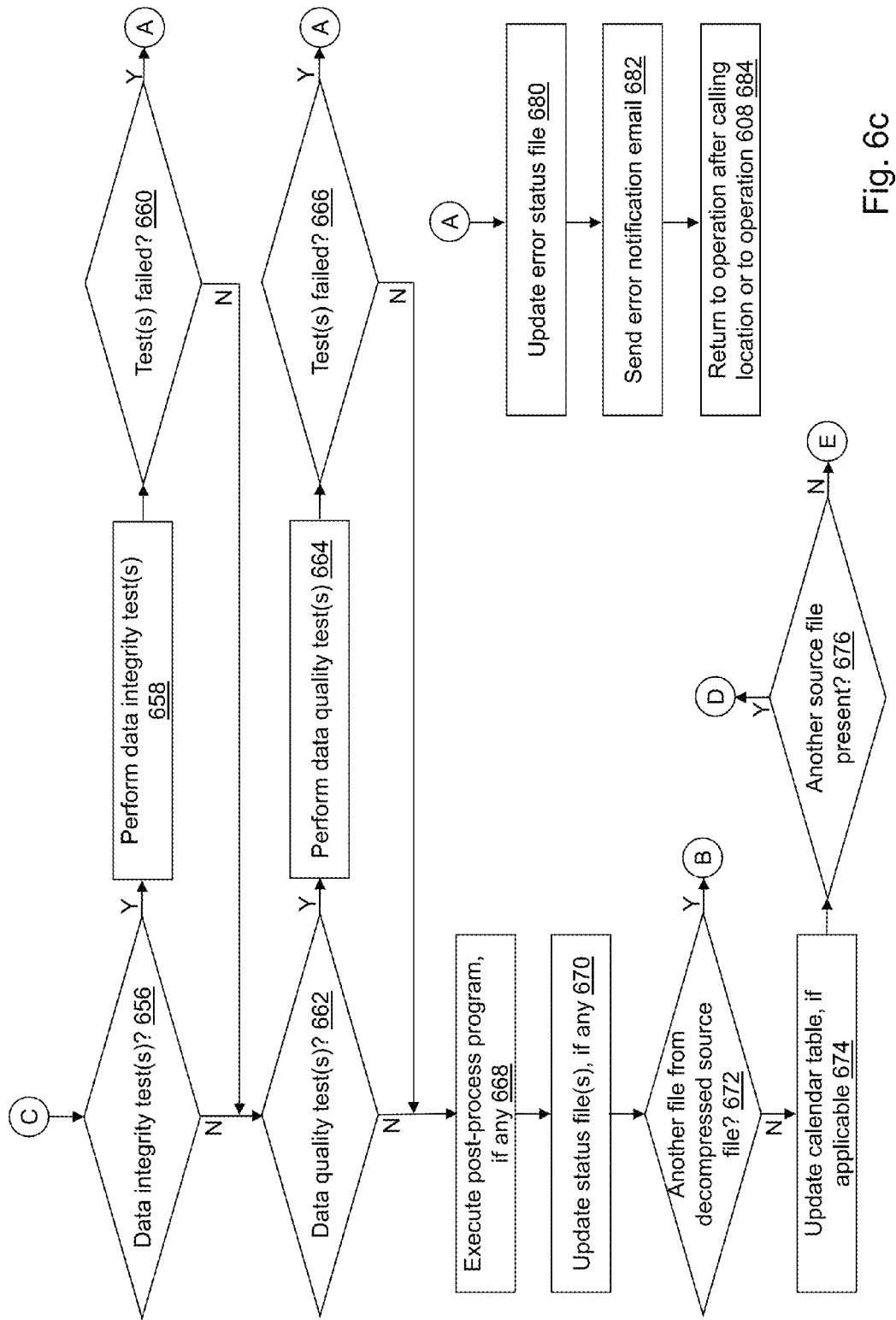

Referring to FIGS. 6a, 6b, and 6c, example operations associated with data intake application 312 of data intake device 104 are described. Additional, fewer, or different operations may be performed depending on the embodiment. The order of presentation of the operations of FIG. 6 is not intended to be limiting. Although some of the operational flows are presented in sequence, the various operations may be performed in various repetitions, concurrently, and/or in other orders than those that are illustrated. As further understood by a person of skill in the art, various operations may be performed in parallel, for example, using a plurality of threads or a plurality of processors such a second processor 310.

Figure 7:
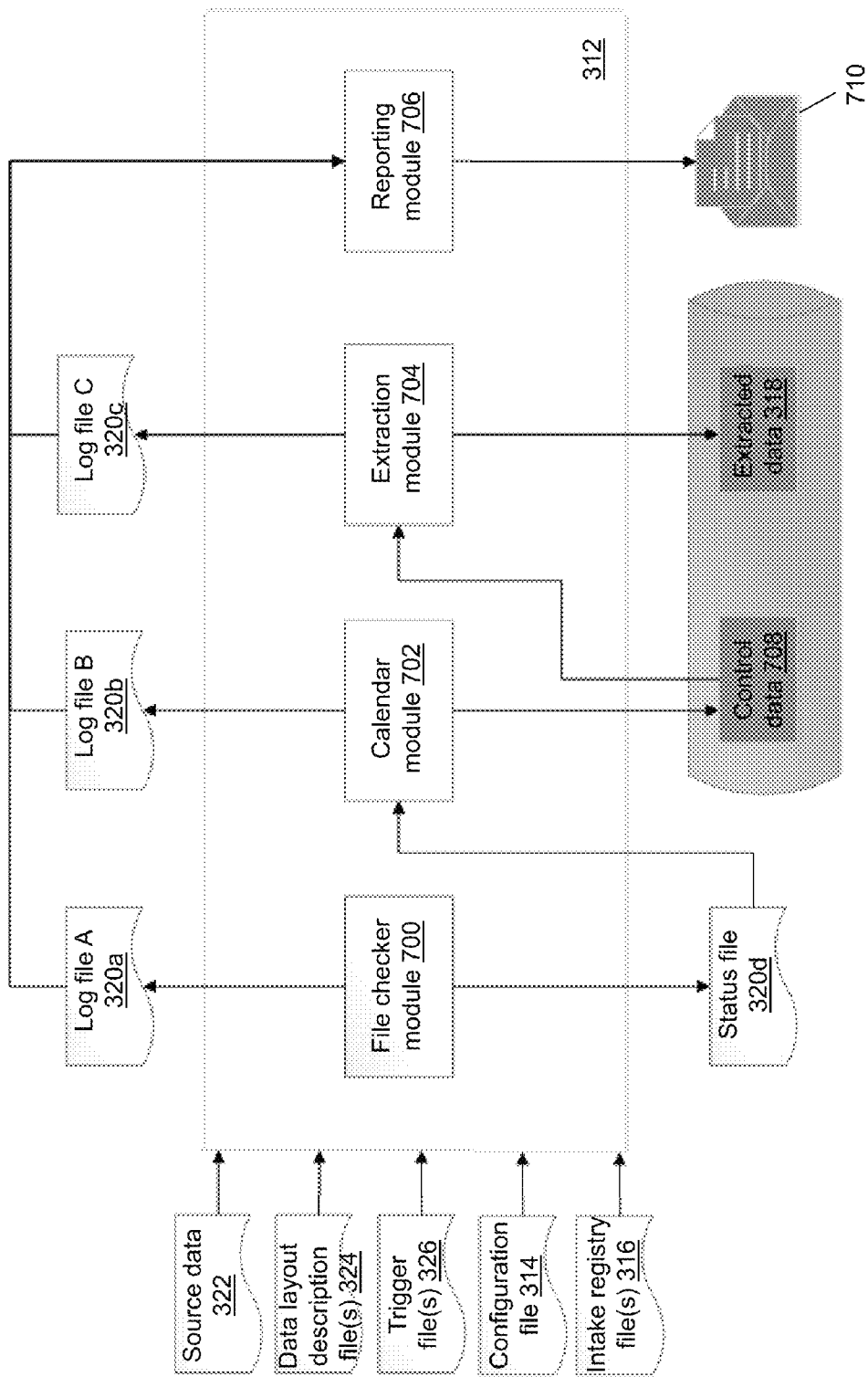
FIG. 7 depicts a block diagram of a data intake application of the data intake device of FIG. 3 in accordance with an illustrative embodiment.

Data intake application 312 may include one or more modules written in the same or different languages that may be executed or run by the same or different processors. For example, in the illustrative embodiment of FIG. 7, data intake application 312 may include a file checker module 700, a calendar module 702, an extraction module 704, and a reporting module 706. File checker module 700, calendar module 702, extraction module 704, and reporting module 706 of data intake application 312 may use information read from the one or more data layout description files 324, the one or more trigger files 326, configuration file 314, and the one or more intake registry files 316 to convert source data 322 to extracted data 318. Control data 708 is used by extraction module 704 to convert source data 322 to extracted data 318.

The one or more status files 320 may include a log file A 320a, a log file B 320b, a log file C 320c, and a status file 320d. Log file A 320a and status file 320d may be maintained by file checker module 700. Log file B 320b may be maintained by calendar module 702. Log file C 320c may be maintained by extraction module 704. Calendar module 702 creates and maintains control data 708 as discussed further below. Status and/or error messages 710 may be created and sent to message locations predefined in configuration file 314 based on a type of the message as discussed further below. Data intake application 312 may be restartable with checkpoint information logged at each point.

For illustration, data intake application 312 may be started using a command line function though other methods may be used, such as double-clicking on an executable, conversion to a daemon process or service, etc. For example, a main program of data intake application 312 may be written in the PERL scripting language and named "data_intake.pl". An example command line may be defined as data_intake.pl [-c<config file>] [-f] [-h], where [ ] indicates optional arguments:

-c <configuration file 314>;
-f force restart, ignoring any checkpoint/restart information; and
-h help on command options.

Execution of data intake application 312 may spawn file checker module 700 and one or more of calendar module 702, extraction module 704, and reporting module 706. For illustration, file checker module 700 may be written in the PERL scripting language; whereas, calendar module 702, extraction module 704, and reporting module 706 may be written in Base SAS.

File checker module 700 looks for files in an incoming directory. If there are one or more files available, file checker module 700 moves the one or more files from the incoming directory to an archive directory and logs this occurrence into status file 320d. File checker module 700 verifies whether the one or more files are expected, as discussed further below. If the one or more files are expected, file checker module 700 moves the one or more files to an un-archive directory after uncompressing and/or decrypting the one or more files. The location of the various directories may be defined in configuration file 314.

Calendar module 702 determines which of the one or more files are due to be processed. A file of the one or more files may be a scheduled file or an ad hoc file. Calendar module 702 may also set-up control data 708 that includes a calendar table for extract processing by extraction module 704.

Extraction module 704 extracts all eligible files passed on by calendar module 702 into extracted data 318 that may be in the form of output tables. Extraction module 704 can be run in parallel with a number of parallel processes as defined in configuration file 314.

Reporting module 706 reads log file A 320a, log file B 320b, and log file C 320c for errors and takes an action that may be defined in configuration file 314. For example, status and/or error messages 710 may be reported to an email address associated with a user of data source device 102 and/or to an email address associated with a user of data intake device 104 depending on the type of error.

Referring again to FIGS. 6a, 6b, and 6c, once started, in an operation 600, data intake application 312 reads configuration file 314. For illustration, Table I below includes illustrative configuration file variables that can be customized for a specific data source device 102.

TABLE I

| Variable | Description |
| --- | --- |
| CUSTOMER | An acronym for a customer is defined here. |
| PROJECT | A name of a project is defined here. |
| CUSTOMERNAME | A long name of the customer is defined here. |
| PROJECTNAME | A long name of the project is defined here. |
| OPS_MAILTO | An email address to send system error notifications is defined here. |
| CUST_MAILTO | An email address to send data issue notifications is defined here. |
| HOMEDIR | A home directory location is defined here. |
| TRANSPORT_DIR | A location of a transport directory is defined here. |
| TRANSPORT_ARCHIVE_DIR | A location of an archive directory is defined here. |
| TRANSPORT_UNARCHIVE_DIR | A location of an un-archive directory is defined here. |
| TRANSPORT_INCOMING_DIR | A location of an incoming directory is defined here. |
| TRANSPORT_OUTGOING_DIR | A location of an SFTP outgoing directory is defined here. |
| SW_HOME | A directory where data intake application 312 is deployed is defined here. This may match HOMEDIR |
| SW_CONF | A location where configuration file 314 is stored is defined here. |
| SW_SASPGMS | A location where SAS programs are stored is defined here. |

TABLE I-continued

| Variable | Description |
| --- | --- |
| SW_SASAUTOS | A location where SAS macros are stored is defined here. |
| MODULES_TO_RUN | Modules to be run, separated by pipe(\|) is defined here. FILECHECKER should be mentioned as a minimum for any meaningful results. Other options are CALENDAR and EXTRACT |
| CALENDAR | A location of calendar module 702 is defined here. |
| EXTRACT | A location of extraction module 704 is defined here. |
| REPORT_ERROR | A location of reporting module 706 is defined here. |
| INITIAL_SETUP | Setup code run only the first time is defined here. |
| CUSTOM_REG | A name and location of a custom intake registry file of the one or more intake registry files 316 is defined here. To turn OFF this registry, blank is assigned to this variable. |
| GENERIC_REG | A name and location of a generic intake registry file of the one or more intake registry files 316 is defined here. To turn OFF this registry, blank is assigned to this variable. |
| CPU_COUNT | A number of maximum parallel processes that can be run is defined here. In general, this variable should not exceed a maximum number of available cores. |
| LOGS_DIR | A main log file directory is defined here. |
| SAS_LOGS | A SAS log file directory is defined here. |
| AUDIT_LOGS | An audit log file directory is defined here. |
| RUN_LOGS | A run log file directory is defined here. |
| LOG_CHANGE | A frequency of log file roll over for audit logs is defined here. Accepted values are MONTHLY, DAILY is defined here. E.g. if MONTHLY is specified, the same log file is used for the entire month. |
| COMPRESSION_PROGRAM | An indicator of a compression program used to compress source data 322 in the archive directory if source data 322 is uncompressed when sent to the incoming directory is defined here. Accepted values may include zip, gz, gzip, tar, tar.gz, tar.bz2, where zip = ZIP, gz and gzip = GZIP, tar = TAR, tar.gz and tgz = TAR + GZIP, tar.bz2 and tbz = TAR + BZ2 |
| LATE_TRIGGER_FILE | A name of the file where late file records are logged is defined here. |
| CHECKPT_FILE | A name of the file in which checkpoint information is logged is defined here. |
| RUNDIR | A directory in which the CHECKPT_FILE and LATE_TRIGGER_FILE are kept is defined here. |
| ARCHIVE_ENCRYPTED | Accepted values are Yes and No. If the value is No, incoming encrypted source data 322 are decrypted and then archived. If Yes, incoming encrypted source data 322 are archived as is. |
| DECRYPT_PGM | An indicator of a decryption program used to decrypt encrypted source data 322 is defined here. |
| UNHANDLED_ERRORS | Variable defines to whom unhandled errors are sent. Possible values are OPS, CUST or OPS\|CUST |
| ERROR_FORWARD | Variable defines an error forwarding mechanism. EMAIL, JIRA, and FTP are options. |
| LATE_ALERT_EMAIL | Variable defines who is notified regarding late receipt of source data 322. Possible values are $OPS_MAILTO, $CUST_MAILTO, or $OPS_MAILTO\|$CUST_MAILTO |
| LATE_ALERT_PAUSE | A number of hours to wait before follow up late alerts are sent is defined here. |
| DATASPEC_FILE | A name of a common data layout description file is defined here. |
| DATASPEC_DIR | A location where the common data layout description file and the one or more data layout description files 324 are stored is defined here. |
| DATASPEC_ARCHIVE_DIR | A location where archive files for the common data layout description and for the one or more data layout description files 324 are stored is defined here. |
| DATASPEC_PROPERTIES | A location where a properties file is created is defined here. |

TABLE I-continued

| Variable | Description |
|---|---|
| UNARCH_FILES_KEEP_DAYS | A number of days that source data 322 is stored in the archive directory after successful processing is defined here. If the value is zero, source data 322 is removed immediately after processing. |
| UNARCH_FILES_KEEP_DAYS_ON_FAILURE | A number of days failed files are kept in the un-archive directory. |
| SASCMD | A command to invoke SAS, e.g., /sso/sfw/sas/930/SASFoundation/9.3/sas is defined here. |
| SASAUTOS | SASAUTOS options before invoking SAS is defined here. |
| CUST_PGM_DIR | A directory where custom SAS codes are stored is defined here. |
| USER_FUNC_DIR | A directory where user function are stored is defined here. |
| SASAUTOS | SASAUTOS path used during SAS invocation is defined here. |
| DQ_ERROR_FORWARD | Channel by which data quality exceptions are forwarded to the customer is defined here. SFTP and JIRA are options. |
| DQ_FILE_DLM | A delimiter used in data quality exception file is defined here. |

In an operation 602, the one or more intake registry files 316 are read. The one or more intake registry files 316 are XML files used to describe attributes of incoming files of source data 322. In an illustrative embodiment, there are two types of intake registry files, a generic intake registry file and a custom intake registry file. The one or more intake registry files 316 support registration of new (unprocessed) incoming files of source data 322 for data intake application 312 to process based on a matching of filename parameters that define naming pattern strings that may include regular expressions. Either or both intake registry files may be used. If both registry files are used, incoming files of source data 322 are matched against the filename parameters that define naming patterns of the custom intake registry file first and are matched against the filename parameters that define naming patterns of the generic intake registry file when no match is found in the custom intake registry file as described further below.

For every incoming file, the one or more intake registry files 316 include at least two hierarchies, a first-level parameters hierarchy and a second-level parameters hierarchy. The first-level parameters hierarchy defines the characteristics of the incoming file, and the second-level parameters hierarchy defines the characteristics of raw data files within the incoming file because some compressions can have multiple files within a file. For example, a tar or zip file may be the incoming file that may include multiple raw data files.

The generic intake registry file is used to process any data file of source data 322 without having to configure the custom intake registry file. For example, by placing a prefix of "auto_" on incoming files of source data 322 with specific file extensions (e.g., csv, txt, sas7dbat, lasr), the data can be simply transferred to hosted data system 106. Other prefixes may be used. The generic intake registry file can be extended to support additional file extensions for additional file formats. Data intake system 100 is designed to handle any compression or encryption on these data files using default compression and encryption. For illustration, the generic intake registry file is configured for three types of files: 1) comma delimited files (.csv), 2) SAS datasets (.sas7bdat), and 3) pipe delimited files (.txt). The file extension matches the filetypes defined in the registry. Below is the content of an example generic intake registry file:

```
<REGISTRY>
 <ENTRY>
  <INCOMING>auto_\w*.csv</INCOMING>
  <FREQ>A</FREQ>
  <CONTENTS>
   <FILE>
    <FILEID>1001</FILEID>
    <FILENAME>auto_\w*.csv</FILENAME>
    <DESCRIPTION>CSV Files</DESCRIPTION>
    <FILETYPE>DLM</FILETYPE>
    <DELIMITER>,</DELIMITER>
    <FIRSTOBS>2</FIRSTOBS>
    <OVERWRITE_FLG>Y</OVERWRITE_FLG>
    <EXTRACT_SCRIPT></EXTRACT_SCRIPT>
    <LAYOUT_FILE></LAYOUT_FILE>
    <OUTPUT_TABLE></OUTPUT_TABLE>
    <PRE_PROCESS_SCRIPT></PRE_PROCESS_SCRIPT>
    <POST_PROCESS_SCRIPT></POST_PROCESS_SCRIPT>
   </FILE>
  </CONTENTS>
 </ENTRY>
 <ENTRY>
  <INCOMING>auto_\w*.sas7bdat</INCOMING>
  <FREQ>A</FREQ>
  <CONTENTS>
   <FILE>
    <FILEID>1002</FILEID>
    <FILENAME>auto_\w*.sas7bdat</FILENAME>
    <DESCRIPTION>SAS Datasets </DESCRIPTION>
    <FILETYPE>SAS</FILETYPE>
    <DELIMITER></DELIMITER>
    <FIRSTOBS>2</FIRSTOBS>
    <OVERWRITE_FLG>Y</OVERWRITE_FLG>
    <EXTRACT_SCRIPT> </EXTRACT_SCRIPT>
    <LAYOUT_FILE></LAYOUT_FILE>
    <OUTPUT_TABLE></OUTPUT_TABLE>
    <PRE_PROCESS_SCRIPT></PRE_PROCESS_SCRIPT>
    <POST_PROCESS_SCRIPT></POST_PROCESS_SCRIPT>
   </FILE>
  </CONTENTS>
 </ENTRY>
 <ENTRY>
  <INCOMING>auto_\w*.txt</INCOMING>
  <FREQ>A</FREQ>
  <CONTENTS>
   <FILE>
    <FILEID>1003</FILEID>
```

```
<FILENAME>auto_\w*.txt</FILENAME>
<DESCRIPTION>Pipe delimitted files </DESCRIPTION>
<FILETYPE>DLM</FILETYPE>
<DELIMITER>|</DELIMITER>
<FIRSTOBS>2</FIRSTOBS>
<OVERWRITE_FLG>Y</OVERWRITE_FLG>
<EXTRACT_SCRIPT></EXTRACT_SCRIPT>
<LAYOUT_FILE></LAYOUT_FILE>
<OUTPUT_TABLE></OUTPUT_TABLE>
<PRE_PROCESS_SCRIPT></PRE_PROCESS_SCRIPT>
<POST_PROCESS_SCRIPT></POST_PROCESS_SCRIPT>
        </FILE>
       </CONTENTS>
      </ENTRY>
    </REGISTRY>
```

For illustration, Table II below includes a description of the first-level parameters included in the first-level parameters hierarchy of the generic intake registry file. The first-level parameters can be customized for specific source data 214 from data source device 102.

TABLE II

| Tag Name | Description |
| --- | --- |
| <INCOMING> | The incoming filename parameter is defined here. The filename parameter can be defined, for example, as a PERL or SAS regular expression or as a string. The incoming filename parameter identifies a matching filename pattern that should be unique to files of source data 322 that use the data included in the corresponding entry to process the source file. In an illustrative embodiment, the filename parameter may include all aspects of the filename except the encryption extension. If the filename is account__20140830.txt.gz.gpg, the matching filename pattern regular expression may be account__\d{8}.txt.gz. The encryption flag is included to tell data intake application 312 that the file is encrypted. The file pattern does not contain the encryption extension though. If the filename is trans__20140830.txt.zip the matching filename pattern regular expression may be trans__\d{8}.txt.zip. |
| <FREQ> | A tag to indicate frequency that the incoming file is received is defined here. A = Ad hoc is an acceptable value indicating the file can be received at any time. |

For illustration, Table III below includes a description of second-level parameters included in the second-level parameters hierarchy of the generic intake registry file. The second-level parameters can be customized for specific source data 214 from data source device 102.

TABLE III

| Tag Name | Description |
| --- | --- |
| <FILEID> | A unique identifier for each incoming file of source data 322 is defined here. |
| <FILENAME> | A name of a raw data file post extraction from the incoming file is defined here. This can be a pattern and can be expressed, for example, in PERL or SAS regular expressions. The second level filename parameter match to this value is after decompression and/or decryption has been run. |
| <DESCRIPTION> | A descriptive name of the incoming file is defined here. |
| <FILETYPE> | A type of the file is defined here. This field may be considered to define a read file indicator. Accepted values are DLM, CSV, SAS<br>DLM = Delimited file<br>CSV = Comma separated file<br>SAS = SAS dataset |
| <DELIMITER> | A delimiter value if <FILETYPE> is DLM. E.g. pipe(\|), tab(\t) is defined here. This field may be considered to define a read file indicator. |
| <FIRSTOBS> | An observation at which data values start is defined here. This field may be considered to define a read file indicator. |
| <OVERWRITE_FLG> | A flag to indicate whether overwrites are allowed for the incoming file is defined here. If the flag is set, a previously successfully processed file can be overwritten by a new file of the same name. Accepted values are Y, N. |
| <EXTRACT_SCRIPT> | A custom extract script indicator is defined here. A custom extract script can be used and if it is used |

TABLE III-continued

| Tag Name | Description |
|---|---|
| | the name of the script is included here. If there is no custom extract script, the field is blank. |
| <LAYOUT_FILE> | A data layout description file of the one or more data layout description files 324 used for this data file is defined here. If the field is blank, data intake application 312 uses the common data layout description file listed in configuration file 314. If there is no layout information regarding this file in the common data layout description file (no matching filename parameter), intake application 312 may use the SAS command "proc import" to extract data from delimited files. An error may be generated by extraction module 704 for a fixed width file if no data layout description file is defined here. This field may be considered to define a read file indicator. |
| <OUTPUT_TABLE> | A name of the output table is defined here. This field can have the following values:<br><TABLE PREFIX>_[RUNDATE]:<br>e.g. tab_[RUNDATE]. The output table name is a concatenation of "tab_" and a run date of the file in yyyymmdd format.<br><TABLE PREFIX>_[pos<n>-pos<n>]:<br>e.g. acc_[pos9-pos16]. If the data file name is account_20140930.txt, the output table is a concatenation of "acc_" and the value from positions 9 to 16 of the data filename. In this example, positions 9 to 16 of the data filename is date "20140930". The output table name is "acc_20140930".<br>Blank:<br>If the field is blank, the output table name is constructed using the first 32 characters of the data file. |
| <PRE_PROCESS_SCRIPT> | A pre-process program indicator is defined here. A pre-process program can be used and if it is used the name of the program is included here. If there is no pre-process program, the field is blank. A pre-process program can be run before the extraction of the data. |
| <POST_PROCESS_SCRIPT> | A post-process program indicator is defined here. A post-process program can be used and if it is used the name of the program is included here. If there is no post-process program, the field is blank. A post-process program can be run after the extraction of the data. |

The custom intake registry file supports registration of expected file types for scheduled data loads. As opposed to the generic intake registry file, the custom intake registry file includes calendar components to confirm data is received when it is expected and that notifications are sent out if not received when expected. Files sent as part of this formal processing may adhere to the following naming convention: yyyymmdd.{HHMM}.{env}.{x_OF_y}.FileName.[Extension].{Compression}.{Encryption}, where the tokens in the filename are defined further below. Tokens within curly braces are optional and can be ignored where not necessary. Tokens within square brackets are mandatory, but multiple options may be available.

"yyyymmdd" represents a date with a four-digit year, two-digit month, and two-digit day. The date used should be consistent and predictable. For example, for daily files the date should be incremented every day and no dates should be repeated for the same file type unless that file is being re-sent as a replacement. Weekly files should represent a consistent day of the week. Monthly files should be a consistent day of the month. If files need to be retransmitted for any reason, or if files are delayed from their expected arrival date, they should retain the expected date prefix so they can be easily identified and tracked.

"HHMM" represents a time in 24 hour format (0000-2359). This token may be useful for sending multiple independent files of the same type for a given day. For example, sending two batches of orders for a single day may look like: 20080101.1200.PRD.1_OF_1.Orders.csv.gz and 20080101.2359.PRD.1_OF_1.Orders.csv.gz.

"Env" represents a server environment that will consume the incoming file. This token may be useful when different sets of data are consumed by different environments such as development, test, production, etc. Various identifiers may be used, for example: PRD—Production, DEV—Development, UAT—User Acceptance Testing, QA—Quality Assurance, etc.

"x_OF_y" indicates that the incoming file is a multi-part file. Large files may need to be split into smaller pieces for file transfer to data intake device 104. "Y" indicates the total number of files in the set, and "X" identifies the sequence each individual file should be processed. The /yyyymmdd/, /HHMM, and /FileName/ portions of the filename should be consistent for all files in the set. For example: 20080101.1405.PRD.1_OF_3.LargeFile.csv.gz, 20080101.1405.PRD.2_OF_3.LargeFile.csv.gz, 20080101.1405.PRD.3_OF_3.LargeFile.csv.gz is a consistent set of files.

"FileName" represents a meaningful filename that corresponds to the content of the file. In some embodiments, the filename should not contain any spaces. Filenames are used to match to the <INCOMING> parameter of the first-level parameters and to the <FILENAME> parameter of the second-level parameters.

"Extension" indicates a general format of the file. Typical file extensions can include .csv for comma separated values, .txt for fixed width or tab delimited text, .sas7bdat for a SAS dataset, .xml for XML text, etc. As with the "FileName" token, the "Extension" should remain consistent. In some embodiments, if multiple data files are being bundled into one file using tar or zip, the name of the file being sent should not include this extension. For example, if 20080101.account.txt and 20080101.transaction.txt are being bundled into one tar file, the resulting file could be named 20080101.daily_files.tar.gz "Compression" represents a type of compression used, where ".zip" indicates use of the Windows WinZip format, ".gz" indicates use of the UNIX gzip utility, ".z" indicates use of the UNIX compress utility, ".tar.gz" indicates use of the UNIX tar utility and use of the UNIX gzip utility, ".tbz or ".tar.bz2" indicates use of the UNIX tar utility and use of the bzip2 compression program. If multiple files are bundled into one file using the tar or zip utilities, this file pattern may be mentioned in the incoming file pattern.

"Encryption" represents a type of encryption used.

For illustration, Table IV below includes a description of first-level parameters of the first-level parameters hierarchy of the custom intake registry file. The first-level parameters can be customized for specific source data 214 from data source device 102.

TABLE IV

| Tag Name | Description |
| --- | --- |
| <INCOMING> | The incoming filename parameter is defined here. The filename parameter can be defined, for example, as a PERL or SAS regular expression or as a string. The incoming filename parameter identifies a matching filename pattern that should be unique to files of source data 322 that use the data included in the corresponding entry to process the source file. In an illustrative embodiment, the filename parameter may include all aspects of the filename except the encryption extension. If the filename is account_20140830.txt.gz.gpg, the matching filename pattern regular expression may be account_\d{8}.txt.gz. The encryption flag is included to tell data intake application 312 that the file is encrypted. The file pattern does not contain the encryption extension though. If the filename is trans_20140830.txt.zip the matching filename pattern regular expression may be trans_\d{8}.txt.zip. |
| <FREQ> | A tag to indicate frequency that the incoming file is received is defined here. Values may include A, D, W, M, Q, Y, where A = Ad hoc, D = Daily, W = Weekly, M = Monthly, Q = Quarterly, Y = Yearly. |
| <TRIGGER_FILE_EXT> | An extension of the one or more trigger files 326 is defined here. E.g. '.done', '.count'. |
| <PARTITIONED> | A flag to indicate whether the incoming file is partitioned is defined here. This field may be considered to define a read file indicator. Accepted values are Y—yes, N—no |
| <RUN_DAYS> | Days on which the incoming file is expected is defined here. If the frequency is set to "A"(ad hoc), all <RUN_ . . . > fields should be blank. This field accepts single values, date ranges, and comma delimited values. For example, single values include: 1 = expected on the first day of the month or * = expected every day. For example, a date range may include 1-5 = expected any day between the $1^{st}$ and the $5^{th}$ days of the month. For example, a comma delimited value may include 1, 3, 5 = expected $1^{st}$, $3^{rd}$ and $5^{th}$ days of the month. |
| <RUN_MONTHS> | Months in which the incoming file is expected is defined here. This field accepts similar values as <RUN_DAYS> with a maximum value of 12. |
| <RUN_DOW> | Days of week the incoming file is expected is defined here. This field accepts similar values as <RUN_DAYS> with a maximum value of 7. |
| <TRIGGER_LOAD_FLG> | A flag to indicate whether trigger load contents should be loaded is defined here. |
| <LATE_ALERT_DUR> | If receipt of the incoming file is delayed, a number of hours after the last expected date-time expected for receipt of the incoming file |

TABLE IV-continued

| Tag Name | Description |
|---|---|
| | after which a late file alert is sent based on the value of LATE_ALERT_EMAIL in configuration file 314 is defined here. |
| <REPROCESS_FLG> | A previously received file can be reprocessed by just sending an associated trigger file if this flag is set to Y. The new trigger filename should be the same as the original trigger filename. Accepted values are Y—yes, N—no. |
| <MAX_DELAY> | A maximum number of hours data intake application 312 waits for remaining parts after the first part of the incoming file is received is defined here. If the file is a partitioned file, data intake application 312 waits for the configured number of hours for remaining parts of the incoming file to be received. If parts arrive after the cut-off time, the files are not processed. Similarly, if a trigger file is expected, data intake application 312 waits for the configured number of hours for the associated trigger file after which the incoming file is invalidated and is not extracted. |
| <ENCRYPTED_FLG> | A flag to indicate whether the incoming file is encrypted is defined here. This field may be considered to define a read file indicator. Accepted values are Y—yes, N—no. |
| <COMPRESSED_FLG> | A flag to indicate whether the file is compressed is defined here. This field may be considered to define a read file indicator. Accepted values are Y—yes, N—no. |
| <EXTRACT_PGM> | An indicator of a compression program used to compress source data 322 in the archive directory if source data 322 is uncompressed when sent to the incoming directory. This field may be considered to define a read file indicator. Accepted values may include zip, gz, gzip, tar, tar.gz, tar.bz2. |
| <DATA_ENCRYPTION_FLG> | A flag to indicate whether the incoming file is encrypted is defined here. This field may be considered to define a read file indicator. Accepted values are Y—yes, N—no. |
| <TRIGGER_ENCRYPTION_FLG> | A flag to indicate whether the trigger file of the one or more trigger files associated with the incoming file 326 is encrypted is defined here. Accepted values are Y—yes, N—no. |

For illustration, Table V below includes a description of second-level parameters of the custom intake registry file are shown.

TABLE V

| Tag Name | Description |
|---|---|
| <FILEID> | A unique identifier for each incoming file of source data 322 is defined here. |
| <FILENAME> | A name of a raw data file post extraction from the incoming file is defined here. This can be a pattern and can be expressed, for example, in PERL or SAS regular expressions. The second level filename parameter match to this value is after decompression and/or decryption has been run. |
| <DESCRIPTION> | A descriptive name of the incoming file is defined here. |
| <FILETYPE> | A type of the file is defined here. This field may be considered to define a read file indicator. Accepted values are DLM, CSV, FIXED_WIDTH, SAS DLM = Delimited file CSV = Comma separated file FIXED_WIDTH = Fixed width file SAS = SAS dataset |
| <DELIMITER> | A delimiter value if <FILETYPE> is DLM. E.g. pipe(\|), tab(\t) is defined here. This field may be considered to define a read file indicator. |

TABLE V-continued

| Tag Name | Description |
| --- | --- |
| <FIRSTOBS> | An observation at which data values start is defined here. This field may be considered to define a read file indicator. |
| <OVERWRITE_FLG> | A flag to indicate whether overwrites are allowed for the incoming file is defined here. If the flag is set, a previously successfully processed file can be overwritten by a new file of the same name. Accepted values are Y, N. |
| <EXTRACT_SCRIPT> | A custom extract script indicator is defined here. A custom extract script can be used and if it is used the name of the script is included here. If there is no custom extract script, the field is blank. |
| <LAYOUT_FILE> | A data layout description file of the one or more data layout description files 324 used for this data file is defined here. If the field is blank, data intake application 312 uses the common data layout description file listed in configuration file 314. If there is no layout information regarding this file in the common data layout description file (no matching filename parameter), intake application 312 may use the SAS command "proc import" to extract data from delimited files. An error may be generated by extraction module 704 for a fixed width file if no data layout description file is defined here. This field may be considered to define a read file indicator. |
| <OUTPUT_TABLE> | A name of the output table is defined here. This field can have the following values:<br><TABLE PREFIX>_[RUNDATE]:<br>e.g. tab_[RUNDATE]. The output table name is a concatenation of "tab_" and a run date of the file in yyyymmdd format.<br><TABLE PREFIX>_[pos<n>-pos<n>]:<br>e.g. acc_[pos9-pos16]. If the data file name is account_20140930.txt, the output table is a concatenation of "acc_" and the value from positions 9 to 16 of the data filename. In this example, positions 9 to 16 of the data filename is date "20140930". The output table name is "acc_20140930".<br>Blank:<br>If the field is blank, the output table name is constructed using the first 32 characters of the data file. |
| <PRE_PROCESS_SCRIPT> | A pre-process program indicator is defined here. A pre-process program can be used and if it is used the name of the program is included here. If there is no pre-process program, the field is blank. A pre-process program can be run before the extraction of the data. |
| <POST_PROCESS_SCRIPT> | A post-process program indicator is defined here. A post-process program can be used and if it is used the name of the program is included here. If there is no post-process program, the field is blank. A post-process program can be run after the extraction of the data. |

Below is the content of an example custom intake registry file that contains information to read in a zip file that includes three raw data files and to read in a single pipe delimited text file.

```
<REGISTRY>
 <ENTRY>
  <INCOMING>sample_multi_file.zip</INCOMING>
  <FREQ>A</FREQ>
  <TRIGGER_FILE_EXT></TRIGGER_FILE_EXT>
  <PARTITIONED>N</PARTITIONED>
  <RUN_DAYS></RUN_DAYS>
  <RUN_MONTHS></RUN_MONTHS>
  <RUN_DOW></RUN_DOW>
  <TRIGGER_LOAD_FLG>N</TRIGGER_LOAD_FLG>
  <LATE_ALERT_DUR></LATE_ALERT_DUR>
  <REPROCESS_FLG></REPROCESS_FLG>
  <MAX_DELAY></MAX_DELAY>
  <COMPRESSED_FLG>Y</COMPRESSED_FLG>
  <EXTRACT_PGM></EXTRACT_PGM>
  <DATA_ENCRYPTION_FLG></DATA_ENCRYPTION_FLG>
  <TRIGGER_ENCRYPTION_FLG></TRIGGER_ENCRYPTION_FLG>
  <CONTENTS>
   <FILE>
    <FILEID>1</FILEID>
    <FILENAME>sample_pipe.txt</FILENAME>
    <DESCRIPTION>Sample Pipe Delimited file</DESCRIPTION>
    <FILETYPE>DLM</FILETYPE>
    <OVERWRITE_FLG>Y</OVERWRITE_FLG>
    <DELIMITER>|</DELIMITER>
```

```
<FIRSTOBS>2</FIRSTOBS>
<EXTRACT_SCRIPT></EXTRACT_SCRIPT>
<LAYOUT_FILE></LAYOUT_FILE>
<OUTPUT_TABLE></OUTPUT_TABLE>
<PRE_PROCESS_SCRIPT></PRE_PROCESS_SCRIPT>
<POST_PROCESS_SCRIPT></POST_PROCESS_SCRIPT>
</FILE>
<FILE>
 <FILEID>2</FILEID>
 <FILENAME>sample_csv.csv</FILENAME>
 <DESCRIPTION>Sample CSV File</DESCRIPTION>
 <FILETYPE>DLM</FILETYPE>
 <OVERWRITE_FLG>Y</OVERWRITE_FLG>
 <DELIMITER>,</DELIMITER>
 <FIRSTOBS>2</FIRSTOBS>
 <EXTRACT_SCRIPT></EXTRACT_SCRIPT>
 <LAYOUT_FILE></LAYOUT_FILE>
 <OUTPUT_TABLE></OUTPUT_TABLE>
 <PRE_PROCESS_SCRIPT></PRE_PROCESS_SCRIPT>
 <POST_PROCESS_SCRIPT></POST_PROCESS_SCRIPT>
</FILE>
<FILE>
 <FILEID>3</FILEID>
 <FILENAME>sample_fixedwidth.dat</FILENAME>
 <DESCRIPTION>sample Fixed Width File</DESCRIPTION>
 <FILETYPE>FIXED_WIDTH</FILETYPE>
 <OVERWRITE_FLG>Y</OVERWRITE_FLG>
 <DELIMITER></DELIMITER>
 <FIRSTOBS>1</FIRSTOBS>
 <EXTRACT_SCRIPT></EXTRACT_SCRIPT>
 <LAYOUT_FILE></LAYOUT_FILE>
 <OUTPUT_TABLE></OUTPUT_TABLE>
 <PRE_PROCESS_SCRIPT></PRE_PROCESS_SCRIPT>
 <POST_PROCESS_SCRIPT></POST_PROCESS_SCRIPT>
</FILE>
</CONTENTS>
</ENTRY>
<ENTRY>
<INCOMING>sample_bad_file.txt</INCOMING>
<FREQ>A</FREQ>
<TRIGGER_FILE_EXT></TRIGGER_FILE_EXT>
<PARTITIONED>N</PARTITIONED>
<RUN_DAYS></RUN_DAYS>
<RUN_MONTHS></RUN_MONTHS>
<RUN_DOW></RUN_DOW>
<TRIGGER_LOAD_FLG>N</TRIGGER_LOAD_FLG>
<LATE_ALERT_DUR></LATE_ALERT_DUR>
<REPROCESS_FLG></REPROCESS_FLG>
<MAX_DELAY></MAX_DELAY>
<COMPRESSED_FLG></COMPRESSED_FLG>
<EXTRACT_PGM></EXTRACT_PGM>
<DATA_ENCRYPTION_FLG></DATA_ENCRYPTION_FLG>
<TRIGGER_ENCRYPTION_FLG></TRIGGER_ENCRYPTION_FLG>
<CONTENTS>
 <FILE>
  <FILEID>4</FILEID>
  <FILENAME>sample_bad_file.txt</FILENAME>
  <DESCRIPTION>Sample Bad File</DESCRIPTION>
  <FILETYPE>DLM</FILETYPE>
  <OVERWRITE_FLG>Y</OVERWRITE_FLG>
  <DELIMITER>|</DELIMITER>
  <FIRSTOBS>2</FIRSTOBS>
  <EXTRACT_SCRIPT></EXTRACT_SCRIPT>
  <LAYOUT_FILE></LAYOUT_FILE>
  <OUTPUT_TABLE></OUTPUT_TABLE>
  <PRE_PROCESS_SCRIPT></PRE_PROCESS_SCRIPT>
  <POST_PROCESS_SCRIPT></POST_PROCESS_SCRIPT>
 </FILE>
</CONTENTS>
</ENTRY>
</REGISTRY>
```

After the initial deployment, if the file requirements of source data 214 changes, the one or more intake registry files 316 can be updated. The FILEID field for existing entries may not be updated. Instead, a new entry can be added with a unique file id (preferably incrementally) or other attributes of the entries can be updated.

Each <INCOMING> field value defined in the one or more intake registry files 316 defines a filename parameter, and each <FILENAME> field defined in the one or more intake registry files 316 defines a filename parameter. The remaining first-level parameters are associated with each filename parameter using the <INCOMING> field. The remaining second-level parameters are associated with each filename parameter using the <FILENAME> field. Each filename parameter of the resulting plurality of filename parameters identifies a matching filename pattern used to define which of the remaining first-level parameters and of the remaining second-level parameters are used for files that match the field values.

In an operation 604, a run control table of control data 708 is created. For illustration, an example of a run control table of control data 708 is shown in Table VI(a) and VI(b) below.

TABLE VI(a)

| Record Identifier | Filechecker Run ID | File Identifier | Frequency Identifier | Project Identifier | File Entry Type | Frequency | Data File Name |
|---|---|---|---|---|---|---|---|
| 1 | R20150325182747 | 18 | 0 | AID | Custom | A | sample_pipe.txt |
| 2 | R20150325183026 | 11 | 84 | AID | Custom | D | def_daily_20140811.csv |
| 3 | R20150325184158 | 18 | 0 | AID | Custom | A | sample_pipe.txt |
| 4 | R20150325185005 | 18 | 0 | AID | Custom | A | sample_pipe.txt |
| 5 | R20150325190317 | 18 | 0 | AID | Custom | A | sample_pipe.txt |
| 6 | R20150325190509 | 1 | 84 | AID | Custom | D | sample_pipe.txt |
| 7 | R20150325190702 | 1 | 84 | AID | Custom | D | sample_pipe.txt |
| 8 | R20150325191704 | 8 | 0 | AID | Custom | A | demographics_20140806.csv |
| 9 | R20150325191945 | 8 | 0 | AID | Custom | A | demographics_20140806.csv |
| 10 | R20150325192033 | 8 | 0 | AID | Custom | A | demographics_20140806.csv |
| 11 | R20150325192306 | 8 | 0 | AID | Custom | A | demographics_20140806.csv |

TABLE VI(b)

| Trigger File Name | File Folder | Unarchive Datetime | Run Status | Delete Status Code |
|---|---|---|---|---|
| sample_pipe.txt.done | /unarchive/R20150325182747 | 25MAR15:18:27:47 | 4 | 1 |
| def_daily_20140811.csv.done | /unarchive/R20150325183026 | 25MAR15:18:30:26 | 2 | 1 |
| sample_pipe.txt.done | /unarchive/R20150325184158 | 25MAR15:18:41:59 | 2 | 1 |
| sample_pipe.txt.done | /unarchive/R20150325185005 | 25MAR15:18:50:05 | 4 | 1 |
| sample_pipe.txt.done | /unarchive/R20150325190317 | 25MAR15:19:03:17 | 4 | 1 |
| sample_pipe.txt.done | /unarchive/R20150325190509 | 25MAR15:19:05:09 | 4 | 1 |
| sample_pipe.txt.done | /unarchive/R20150325190702 | 25MAR15:19:07:02 | 2 | 1 |
| | /unarchive/R20150325191704 | 25MAR15:19:17:05 | 2 | 1 |
| | /unarchive/R20150325191945 | 25MAR15:19:19:45 | 2 | 1 |
| | /unarchive/R20150325192033 | 25MAR15:19:20:35 | 4 | 1 |
| | /unarchive/R20150325192306 | 25MAR15:19:23:06 | 2 | 1 |

In an operation 606, a calendar table of control data 708 is created. For example, the calendar table is created by evaluating the custom intake registry file to determine when each incoming file is expected. For illustration, an example of a calendar table of control data 708 is shown in Table VII below.

TABLE VII

| File Identifier | Frequency Identifier | Expected File Pattern | Frequency | First Expected Date | Last Expected Date | Late Alert Duration In Hours | Reprocess Flag | Last Alert Sent Datetime |
|---|---|---|---|---|---|---|---|---|
| 1 | 115 | xyz_daily_(\d{8})_file1.txt | D | 20150425 | 20150425 | 12 | 0 | 10 JUN. 2015:06:50:20 |
| 1 | 116 | xyz_daily_(\d{8})_file1.txt | D | 20150426 | 20150426 | 12 | 0 | 10 JUN. 2015:06:50:20 |
| 1 | 117 | xyz_daily_(\d{8})_file1.txt | D | 20150427 | 20150427 | 12 | 0 | 10 JUN. 2015:06:50:20 |
| 1 | 118 | xyz_daily_(\d{8})_file1.txt | D | 20150428 | 20150428 | 12 | 0 | 10 JUN. 2015:06:50:20 |
| 1 | 119 | xyz_daily_(\d{8})_file1.txt | D | 20150429 | 20150429 | 12 | 0 | 10 JUN. 2015:06:50:20 |
| 1 | 120 | xyz_daily_(\d{8})_file1.txt | D | 20150430 | 20150430 | 12 | 0 | 10 JUN. 2015:06:50:20 |
| 1 | 145 | xyz_daily_(\d{8})_file1.txt | D | 20150525 | 20150525 | 12 | 0 | 10 JUN. 2015:06:50:20 |
| 1 | 146 | xyz_daily_(\d{8})_file1.txt | D | 20150526 | 20150526 | 12 | 0 | 10 JUN. 2015:06:50:20 |
| 1 | 147 | xyz_daily_(\d{8})_file1.txt | D | 20150527 | 20150527 | 12 | 0 | 10 JUN. 2015:06:50:20 |

For example, an expected receipt timer is defined for each file included in the first-level parameters that is not indicated as Ad hoc (<FREQ>A</FREQ>) based on the value specified in the <FREQ> field and the values specified in the <RUN_ . . . > fields. The expected receipt timer may include the value specified in the <LATE_ALERT_DUR> field. As another example, for a partitioned file, an expected receipt timer may be defined after receipt of the first file in the set to include the value specified in the <MAX_DELAY> field.

In an operation 608, a determination is made concerning whether or not the expected receipt timer has expired for any incoming file based on a review of values defined in the calendar table of control data 708. If an expected receipt timer has expired, processing continues in an operation 680. If an expected receipt timer has not expired, processing continues in an operation 610.

In operation 610, the incoming directory, for example, defined by the value specified for the <TRANSPORT_INCOMING_DIR> variable in configuration file 314, is scanned for receipt of new source data 322 that is a copy of source data 214 received from data source device 102. The scan interval may be user definable.

In an operation 612, a determination is made concerning whether or not new source data 322 is stored in the incoming directory. If new source data 322 is stored in the incoming directory, processing continues in an operation 614. If new source data 322 is not stored in the incoming directory, processing continues in operation 608 to continue to monitor for expiration of any expected receipt timers and storage of any new source data.

In operation 614, the new source data 322 is stored in the archive directory, for example, defined by the value specified for the <TRANSPORT_ARCHIVE_DIR> variable in configuration file 314. The new source data 322 is stored in the archive directory to ensure the original files can be restored as needed due to any processing or hardware failures. Operation 614 includes compressing the source data if the source data is not already compressed to minimize the disk space required to support archiving. Archive file names may receive a timestamp suffix to ensure files with the same name are archived uniquely.

In an operation 616, a source file is selected from the new source data 322 stored in the archive directory.

In an operation 618, a filename match is identified by comparing the values associated with each <INCOMING> field value with a filename of the selected source file to define which of the remaining first-level parameters are used for the selected source file. The comparison may be a string match or a regular expression match depending on how the <INCOMING> field value is defined. If both registries are used, an attempt to match the filename of the selected source file to the filename parameters included in the custom intake registry file may be performed first and an attempt to match the filename of the selected source file to the filename parameters included in the generic intake registry file may be performed second when no match is found in the custom intake registry file.

In an operation 619, a determination is made concerning whether or not a matching filename parameter was identified in operation 618. If a matching filename parameter was identified in operation 618, processing continues in an operation 620. If matching filename parameter was not identified in operation 618, processing continues in operation 680 in FIG. 6c.

In operation 620, a determination is made concerning whether or not the selected source file is expected. For example, the receipt time may be compared to values stored in the calendar table of control data 708 based on the value specified in the <FREQ> field and the values specified in the <RUN_. . . > fields of the matching filename parameter. If the selected source file is expected, processing continues in an operation 622. If the selected source file is not expected, processing continues in operation 680.

In operation 622, a determination is made concerning whether or not the selected source file is compressed. For example, the determination may be based on the value specified in the <COMPRESSED_FLG> field of the matching filename parameter. If the selected source file is compressed, processing continues in an operation 624. If the selected source file is not compressed, processing continues in an operation 626.

In operation 624, the selected source file is decompressed using SCRIPT.

In operation 626, a determination is made concerning whether or not the selected source file is encrypted. For example, the determination may be based on the value specified in the <DATA_ENCRYPTION_FLG> field of the matching filename parameter. If the selected source file is encrypted, processing continues in an operation 628. If the selected source file is not encrypted, processing continues in an operation 630.

In operation 628, the selected source file is decrypted. Data intake application 312 may use the location of the un-archive directory to decompress and process the selected source file. The values specified for the UNARCH_FILES_KEEP_DAYS and the UNARCH_FILES_KEEP_DAYS_ON_FAILURE variables in configuration file 314 specify how long un-archived files are kept when processing is successful and when error conditions occur, respectively.

In operation 630, a determination is made concerning whether or not a trigger file of the one or more trigger files 326 associated with the selected source file is present. For example, the incoming directory may be scanned for a trigger file having a matching filename pattern to the selected source file and having the extension specified in the <TRIGGER_FILE_EXT> field of the matching filename parameter. For illustration, if the filename of the selected source file is 20080101.1405.PRD.claims.txt.gz, the trigger file may be named 20080101.1405.PRD.claims.txt.gz.count if the extension specified in the <TRIGGER_FILE_EXT> field of the matching filename parameter is ".count". If the source file being sent is 20080101.1405.PRD.claims.txt.gz.gpg, the trigger file may be named 20080101.1405.PRD.claims.txt.gz.count because the trigger filename does not contain the extension ".gpg" that indicates the encryption extension.

If the trigger file is present, processing continues in an operation 632. If the trigger file is not present, processing continues in an operation 634.

In operation 632, the received trigger file is read. If the value specified in the <TRIGGER_ENCRYPTION_FLG> field of the matching filename parameter indicates that the trigger file is encrypted, the received trigger file is decrypted as part of reading the trigger file. For example, if the trigger file is encrypted, the trigger filename may be named 20080101.1405.PRD.claims.txt.gz.count or 20080101.1405.PRD.claims.txt.gz.done after decryption.

The one or more trigger files 326 may be plain text files that contain information used to audit the file transfer and to perform one or more data integrity tests. Trigger files may be transferred to data intake device 104 from data source device 102 after the selected source file has been transferred to indicate completion of the transfer. The one or more trigger files 326 may be optional.

Each of the one or more trigger files 326 may include a filename, a number of records, a checksum value, and a modification date that define a data integrity test value for the selected source file. The modification data may include a begin date and an end date. The filename may be the filename of one or more source files after decompression and decryption. If multiple files are being bundled into one file, the filename is the name of the individual data files within the bundle. For illustration, the checksum value may be an md5 hash of the uncompressed individual data file. A trigger file of the one or more trigger files 326 may be empty to serve as an indicator that source data 322 is ready to be extracted. In an illustrative embodiment, if the trigger file is populated, the filename and the number of records may be required while the remaining fields are optional.

An example trigger file may be named "sample_pipe.txt.count" and include sample_pipe.txt|428|02/12/2015|02/12/2015|5e364dc47504d63e45f999d4d923bd2f, where "sample_pipe.txt" is the filename, 428 is the number of records, "02/12/2015" is the begin date, 02/12/2015" is the end date, and "5e364dc47504d63e45f999d4d923bd2f" is the checksum value. "|" is the delimiter. If the field value is not included, the delimiter is still included.

If the file is bundled, the trigger file includes a line for each individual file. For example, if datafiles 20080201.1405.PRD.account.txt and 20080201.1405.PRD.trans.txt are sent in a compressed tar file, 20080201.1405.PRD.daily_files.tar.gz, the trigger contents could include 20080201.1405.PRD.account.txt|13456|20080101|20080131|4a8d188b464d80212916e-09440d34117 and 20080201.1405.PRD.trans.txt|1248|20080101|20080131|7a0y488b464n80212916e09440b87-654.

Referring to FIG. 6*b*, in operation 634, the selected source file or a file of multiple files bundled into the selected source file is selected. For example, if datafiles 20080201.1405.PRD.account.txt and 20080201.1405.PRD.trans.txt are sent in a compressed tar file, 20080201.1405.PRD.daily_files.tar.gz, the uncompressed file 20080201.1405.PRD.account.txt may be selected.

In an operation 636, a filename match is identified by comparing the values associated with each <FILENAME> field value of the matching filename parameter identified from the <INCOMING> field value to define which of the remaining second-level parameters are used for the selected source file. If there is only <FILENAME> field value of the matching filename parameter identified from the <INCOMING> field value, the associated values are used to define which of the remaining second-level parameters are used for the selected source file. The comparison may be a string match or a regular expression match depending on how the <FILENAME> field value is defined.

In an operation 637, a determination is made concerning whether or not a matching filename parameter was identified in operation 636. If a matching filename parameter was identified in operation 636, processing continues in an operation 638. If matching filename parameter was not identified in operation 636, processing continues in operation 680.

In operation 638, any pre-process program indicator identified from the <PRE_PROCESS_SCRIPT> field value for the matching second level parameters is executed for the selected source file. The pre-process program associated with the pre-process program indicator may be implemented in software (e.g., comprised of computer-readable and/or computer-executable instructions) stored in second computer-readable medium 308 and accessible by second processor 310 for execution of the instructions that embody the operations of the pre-process program. The pre-process program may be written using one or more programming languages, assembly languages, scripting languages, etc. The pre-process program may be implemented as a Web application.

In operation 640, a determination is made concerning whether or not a data layout description file of the one or more data layout description files 324 associated with the selected source file is present. A delimited file such as a comma-delimited file may include a list of source files for which a data layout description file should be present. The data layout description file is used to define the layout of the selected source file. The data layout description file can be one common file for the entire project or one per data file. The common data layout description file name may match the value defined in the <DATASPEC_FILE> variable of configuration file 314. If the data layout description file is one per data file, the data layout description filename matches the value defined in the <LAYOUT_FILE> field of the matching second-level filename parameter. The data layout description file may be sent along with the selected source file. The one or more data layout description files may be stored in the location defined by the <DATASPEC_DIR> variable in configuration file 314.

For illustration, Table VIII below includes a description of a data layout description file.

TABLE VIII

| Variable | Description |
|---|---|
| extract_file_description | A descriptive name of the source file for identification is defined here. |
| extract_file_pattern | A filename pattern. This should be same as the <FILENAME> field in the one or more intake registry files 316 is defined here. |
| extract_field_order | An order of the fields in the output table identified in the <OUTPUT_TABLE> field in the one or more intake registry files 316 is defined here. |
| extract_field_name | A name of the column in the source file is defined here. |
| extract_field_label | A column label in the output table identified in the <OUTPUT_TABLE> field in the one or more intake registry files 316 is defined here. If blank, extract_field_name values are used. |
| extract_field_type | A data type of the column is defined here. Accepted values may include char for character and num for numeric. |
| extract_field_length | A length of the column is defined here. |
| extract_field_format | A format to be used in the output table identified in the <OUTPUT_TABLE> field in the one or more intake registry files 316 is defined here. If blank, no formatting is done. |
| extract_field_informat | A format to be used while reading the source file is defined here. If blank, a default format is used. |
| extract_dq_rule | An indicator of a data quality test to execute is defined here. If blank, no data quality test is executed. |

Figure 8:
FIG. 8 depicts a content of a data layout description file in accordance with an illustrative embodiment.

Referring to FIG. 8, a content 800 of a data layout description file is shown in accordance with an illustrative embodiment. If a row fails a particular data quality test, it is written to a data quality exception dataset along with a reason for the data quality test failure. If multiple rules fail, all failed rules may be documented in the exception dataset. The exception dataset can be configured to be sent back to data source device 102. For illustration, Table IX below includes a description of illustrative data quality test types.

TABLE IX

| Data quality test type | Description |
|---|---|
| DQ_DATA_TYPE | Test checks whether the data in the specific column contains the data type specified. |
| DQ_INLIST(list=val1:val2:val3) | Test verifies whether the data in the specific column is one of the values in the list. |

TABLE IX-continued

| Data quality test type | Description |
| --- | --- |
| DQ_DIGITS | Test verifies whether the data in the specific column contains only digits. |
| DQ_CHARS | Test verifies whether the data in the specific column contains only characters. |
| DQ_ALPHANUM | Test verifies whether the data in the specific column contains only alphanumeric characters. |
| DQ_NOTNULL | Test verifies whether the data in the specific column is not null. |
| DQ_INRANGE(val1-val2) | Test verifies whether the data in the specific column is within the range val1-val2 specified inclusive of boundary values. |
| DQ_EXRANGE(val1-val2) | Test verifies whether the data in the specific column is within the range val1-val2 specified exclusive of boundary values. |
| DQ_LOOKUP(library.sasdsn.column) | Test verifies whether the data in the specific column is in a look-up table defined by library.sasdsn.column. |

If the data layout description file is present, processing continues in an operation 642. If the data layout description file is not present, processing continues in an operation 644.

In operation 642, the received data layout description file is read for the selected source file. In operation 644, a data layout description file is created automatically. A data layout description file may be created for certain file types (e.g., delimited file types) when a data layout description file is not present. The automatically generated data layout description file may be edited and the length, formats, and other properties can be validated.

In an operation 646, a determination is made concerning whether or not a custom extract script indicator is defined in the <EXTRACT_SCRIPT> field of the matching filename parameter identified in operation 636. If a custom extract script indicator is defined, processing continues in an operation 648. If a custom extract script indicator was not defined, processing continues in operation 650.

In operation 648, any custom extract script identified from the <EXTRACT_SCRIPT> field value for the matching second level parameters is executed on the selected source file. The custom extract script may be implemented in software (e.g., comprised of computer-readable and/or computer-executable instructions) stored in second computer-readable medium 308 and accessible by second processor 310 for execution of the instructions that embody the operations of the custom extract script. The custom extract script may be written using one or more programming languages, assembly languages, scripting languages, etc. The custom extract script may be implemented as a Web application. Below is a sample extract script for illustration:

libname sasext "/aid/warehouse/quicketl/sinlef/extract/extractETL";

data sasext.custom_table;

attrib id length=8;

attrib name length=$50;

attrib age length=8;

infile "&incoming_dir/&datafile" dsd dlm=',' lrecl=32767;

input id name age;

run;

As another example, the custom extract script below extracts data from a custom JavaScript object notation (JSON) object using standard java libraries for JSON.

```
* set the java classpath;
options source;
OPTIONS SET=CLASSPATH
"/dig/projects/ADI2/sas/programs/java:/dig/projects/ADI2/sas/programs/
java/json-simple-1.1.1.jar:/dig/projects/ADI2/sas/programs/java/javax.json-
1.0.jar";
*get to the location of the input file;
%let jsonfile = &INCOMING_DIR./&DATAFILE;
* call java to ingest file as a data set;
*write the file out based on the output table name in the ADI registry;
data adiext.&OUTPUT_TABLE_ENTRY.;
    length b rowid objid parid 8 parsed name value $200;
    *instantiate the Java Object;
    declare javaobj j ('com.sas.sso.solutions.JSONConsumer', "&json-
file.");
    j.callVoidMethod ('processJSONFile');
    j.callBooleanMethod('hasNext', b);
    do while(b);
        j.callStringMethod('next', parsed);
        rowid = input(substr(parsed, 1, find(parsed, '')), 8.);
        parsed = strip(substr(parsed, find(parsed, '')));
        objid = input(substr(parsed, 1, find(parsed, '')), 8.);
        parsed = strip(substr(parsed, find(parsed, '')));
        parid = input(substr(parsed, 1, find(parsed, '')), 8.);
        parsed = strip(substr(parsed, find(parsed, '')));
        name = strip(substr(parsed, 1, find(parsed, '')));
        value = strip(substr(parsed, find(parsed, '')));
        output;
        j.callBooleanMethod('hasNext', b);
    end;
    drop b parsed;
run;
```

A new registry entry may be added to the custom intake registry file of intake registry files 316 (e.g., adi_custom_reg.xml) to enable the described example. The registry updates are illustrated in FIG. 9, which includes XML text 900, and are summarized below:

(1) Incoming file pattern 902—the file pattern for the JSON object to receive;

(2) File ID 904—unique ID (7) assigned to the JSON file to receive;

(3) Filename 906—same as incoming file pattern 902 because the JSON file is not compressed;

(4) FileType 908—set to "CUSTOM";

(5) Extract_Script 910—a name of the custom extract script;

(6) Output_Table 912—an output table name for the extract script to reference when extracting input; and (7) Post_Process_Script 914—a name of a custom post_process script.

In operation 650, a default extractor is executed on the selected source file. The default extractor may be implemented in software (comprised of computer-readable and/or computer-executable instructions) stored in second computer-readable medium 308 and accessible by second processor 310 for execution of the instructions that embody the operations of the default extractor. The default extractor may be written using one or more programming languages, assembly languages, scripting languages, etc. The default extractor may be executed/kicked off from a web application. For illustration, if the selected source file is a comma delimited file, for example, as indicated by the extension "csv", a default extractor is executed that extracts comma delimited text. For illustration, if the selected source file is a SAS dataset, for example, as indicated by the extension "sas7bdat", a default extractor is executed that extracts data from a SAS dataset. For illustration, if the selected source file is a pipe delimited file, for example, as indicated by the extension "txt", a default extractor is executed that extracts pipe delimited text.

If a file extraction fails due to a data layout issue, a corrected file can be sent again. The filename should match the original filename.

In an operation 652, a determination is made concerning whether or not the file is a partitioned file as defined in the <PARTITIONED> field of the matching filename parameter identified in operation 636. If the file is a partitioned file, processing continues in an operation 654. If the file is not a partitioned file, processing continues in an operation 656. In operation 654, the partitioned files are appended.

In operation 656, a determination is made concerning whether or not any data integrity test or tests is performed based on the trigger file. If a data integrity test is performed, processing continues in an operation 658. If a data integrity test is not performed, processing continues in an operation 662.

In operation 658, the one or more data integrity tests are performed. For example, one or more of a number of records test, a begin date test, an end date test, a checksum test, etc. is performed based on the fields defined in the trigger file, if any, for the selected source file. The integrity test may be performed by comparing the defined data integrity test value read from a line of the trigger file to a test value determined by reading the selected source file.

In operation 660, a determination is made concerning whether or not any data integrity test or tests failed. If a data integrity test failed, processing continues in operation 680. If a no data integrity test failed, processing continues in operation 662.

In operation 662, a determination is made concerning whether or not any data quality test or tests is performed based on the data layout description file. If a data quality test is performed, processing continues in an operation 664. If a data quality test is not performed, processing continues in an operation 668.

In operation 664, the one or more data quality tests are performed on each column read from the selected source file based on the entries in the "extract_dq_rule" column for that column (columns in the selected source file are defined as a row of the data layout description file.

In operation 666, a determination is made concerning whether or not any data quality test or tests failed. If a data quality test failed, processing continues in operation 680. If no data quality test failed, processing continues in operation 668.

In operation 668, any post-process program identified from the <POST_PROCESS_SCRIPT> field value for the matching second level parameters is executed. The post-process program may be implemented in software (comprised of computer-readable and/or computer-executable instructions) stored in second computer-readable medium 308 and accessible by second processor 310 for execution of the instructions that embody the operations of the post-process program. The post-process program may be written using one or more programming languages, assembly languages, scripting languages, etc. The post-process program may be implemented as a Web application. For illustration, a post-process program can load data into a data base management system, an in-memory server, into a Hadoop file system, etc.

Table X provides an example of a list of macro variables that may be available for a custom extract script, a pre-process program, and/or a post-process program to use.

TABLE X

| Macro Variable | Description |
| --- | --- |
| &datafile | Name of the source file |
| &project_cd | Name of the project as defined in configuration file 314. |
| &triggerfile | Name of the trigger file associated with the source file |
| &incoming_dir | Directory in which the source file is extracted and is available |
| &description | Description of the source file from the custom intake registry file |
| &file_pattern | File pattern from the custom intake registry file |
| &filetype | Filetype from the custom intake registry file |
| &file_delimiter | File delimiter from the custom intake registry file |
| &output_table | Name of the output table |
| &id | Unique id per job to identify an individual job from among parallel processes. This value may not be unique across runs but may be unique for a single run. |
| &dqdsn | A data quality dataset name |

In an operation 670, one or more of the status files 320 are updated to indicate success or failure of the extraction from the selected source file. One or more signal files can be produced to communicate status/success/failure of data intake back to data source device 102 or to downstream processes in hosted data system 106.

In operation 672, a determination is made concerning whether or not another file is included in a bundled file. If another file is included in a bundled file, processing continues in operation 634 to select and process the next file. For example, if data files 20080201.1405.PRD.account.txt and 20080201.1405.PRD.trans.txt are sent in a compressed tar file, 20080201.1405.PRD.dailyfiles.tar.gz, the uncompressed file 20080201.1405.PRD.trans.txt may be selected next. If another file is not included in a bundled file, processing continues in an operation 674.

In operation 674, the calendar table of control data 708 is updated as needed to indicate a next expected receipt time for the selected source file.

In operation 676, a determination is made concerning whether or not another source file is present in the archive location. If another file is present, processing continues in operation 616 to select and process the next file. If another file is not present, processing continues in operation 608 to continue to monitor for expiration of any expected receipt timers and storage of any new source data.

In operation 680, an error status file is updated. For example, an error message may be generated in one of log file A 320*a*, log file B 320*b*, or log file C 320*c*. In an operation 682, an error notification email may be sent. For example, status and/or error messages 710 may be created and sent to message locations predefined in configuration file 314 based on a type of the message selected based on which operation called operation 680. Processing may continue in either operation 608 or in an operation immediately after the operation that called operation 680 depending on whether or not the subsequent processing can continue based on the error that occurred. For example, processing continues if errors happen during extraction of data unless a fatal error (e.g., validation of custom registry fails) occurs, in which case processing stops.

Processing through operations 600-684 continues until processing is stopped as understood by a person of skill in the art. As mentioned previously, multiple instances of extraction module 704 may be executing in parallel. For illustration, extraction module 704 may be executing operations 640 to 650.

Data intake application 312 provides a standardized process to automate the intake of data, and all that entails including archiving, encryption, data integrity/quality tests, decryption, audit trail, error handling, notifications, etc. Data intake application 312 further automates the extraction and data quality processes for supported file types without any need to write code or create jobs. The extraction and data quality processes can either be ad hoc or scheduled. Data intake application 312 provides one standardized component to automate the loading and processing of ad hoc data, sample data, and scheduled data. Traditionally, it has taken manual intervention to set up these processes and to execute some of these tasks. Data intake application 312 uses configurable intake registry files to configure the automatic data intake process to meet unique project needs, which makes getting data into a hosted data system 106 a seamless process.

Among other advantages, data intake application 312 further:
  provides a standardized workflow, logging, audit trail;
  supports immediate processing;
  makes hosted end users (customers) self-sufficient and makes data ingestion seamless to them;
  supports immediate processing and utilization of data as it is received, even if the file is sent in an ad-hoc manner;
  provides seamless paralleled processing of extracts when multiple files exist;
  provides automatic extraction of data saving many man hours for coding ETL jobs; and
  provides a calendar feature for scheduling and built in alerting when schedules are not met.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

Some aspects may utilize the Internet of Things (IoT), where things (e.g., machines, devices, phones, sensors) can be connected to networks and the data from these things can be collected and processed within the things and/or external to the things. For example, with the IoT there can be sensors in many different devices, and high value analytics can be applied to identify hidden relationships and drive increased efficiencies. This can apply to both Big Data analytics and realtime (streaming) analytics.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device control the computing device to:
  automatically read a registry file,
    wherein the registry file includes a plurality of filename parameters,
    wherein each filename parameter of the plurality of filename parameters identifies a matching filename pattern,
    wherein an extract script indicator and a read file indicator are associated with each filename parameter,
    wherein the extract script indicator indicates an extract script for a file having a filename that matches the matching filename pattern,
    wherein the read file indicator indicates how to read the file having the filename that matches the matching filename pattern;
  automatically determine whether unprocessed source data is stored in a predefined directory;
  based upon determining that unprocessed source data is stored in the predefined directory,
    automatically select a source file from the unprocessed source data;
    automatically select one parameter of the plurality of filename parameters read from the registry file by matching a filename of the selected source file to the matching filename pattern of the one parameter;
    determine whether the selected source file is expected based on a time parameter read from the registry file in association with the selected one parameter;
    based upon determining that the selected source file is not expected based on the time parameter, update an error status file to include a first error message;
    automatically select the extract script based on the extract script indicator associated with the selected one parameter;
    automatically read data from the selected source file using the selected extract script and using the read file indicator associated with the selected one parameter; and
    automatically output the read data to a different file than the source file;
  determine whether a trigger file for the selected source file is stored in the predefined directory; and
  based upon determining that the trigger file for the selected source file is stored in the predefined directory, read the trigger file to define a data integrity test value for the selected source file;

perform an integrity test by comparing the defined data integrity test value to a test value determined from the read data;

determine whether the performed integrity test fails; and based upon determining that the performed integrity test fails, update the error status file to include a second error message.

2. The non-transitory computer-readable medium of claim 1, wherein the extract script for a first file having a first filename that matches a first matching filename pattern is different from the extract script for a second file having a second filename that matches a second matching filename pattern.

3. The non-transitory computer-readable medium of claim 1, wherein the extract script indicator associated with the selected one parameter is blank indicating that the selected extract script is a default extractor.

4. The non-transitory computer-readable medium of claim 1, wherein, before determining whether the trigger file for the selected source file is stored in the predefined directory, the computer-readable instructions further control the computing device to:

automatically read a partitioned indicator associated with the selected one parameter and read from the registry file, wherein the partitioned indicator indicates whether or not the selected source file is part of a plurality of files that have been partitioned;

based upon determining that the selected source file is part of the plurality of files, automatically determine whether or not all of the plurality of files are stored in the predefined directory; and based upon determining that all of the plurality of files are stored in the predefined directory and based upon determining that the trigger file for the selected source file is stored in the predefined directory, append the plurality of files to create a single file.

5. The non-transitory computer-readable medium of claim 4, wherein the integrity test is performed on the created single file.

6. The non-transitory computer-readable medium of claim 1, wherein the registry file further includes a second-level filename parameter associated with each filename parameter of the plurality of filename parameters, wherein each second-level filename parameter identifies a second matching filename pattern, wherein the extract script indicator and the read file indicator are associated with the second-level filename parameter associated with each filename parameter of the plurality of filename parameters.

7. The non-transitory computer-readable medium of claim 6, wherein at least one filename parameter of the plurality of filename parameters includes a plurality of second-level filename parameters associated with the at least one filename parameter.

8. The non-transitory computer-readable medium of claim 1, wherein the read data is output to a second predefined directory different from the predefined directory, wherein the predefined directory and the second predefined directory are defined in a configuration file before automatically determining whether the unprocessed source data is stored in the predefined directory.

9. The non-transitory computer-readable medium of claim 1, wherein the read data is output to a different, non-transitory computer-readable medium of a different computing device.

10. The non-transitory computer-readable medium of claim 1, wherein the read data is further automatically output in a different format than a format used in the source file.

11. The non-transitory computer-readable medium of claim 10, wherein the computer-readable instructions further control the computing device to:

determine whether a data layout description file for the selected source file is stored in the predefined directory; and based upon determining that the data layout description file for the selected source file is stored in the predefined directory, read a data output description from the data layout description file, wherein the different format is based at least partially on the read data output description.

12. The non-transitory computer-readable medium of claim 11, wherein the data output description includes at least one of a table name, a field order indicator, a column label indicator, a field type indicator, a field format indicator, and a field length indicator.

13. The non-transitory computer-readable medium of claim 1, wherein the data integrity test value is selected from the group consisting of a number of records, a checksum value, and a modification date.

14. The non-transitory computer-readable medium of claim 1, wherein the computer-readable instructions further control the computing device to:

determine whether a data layout description file for the selected source file is stored in the predefined directory; and based upon determining that the data layout description file for the selected source file is stored in the predefined directory, read the data layout description file to define a data quality test for the selected source file;

perform the defined data quality test on the read data;

determine whether the performed, defined data quality test fails; and based upon determining that the performed, defined data quality test fails, send an error notification message to a predefined address.

15. The non-transitory computer-readable medium of claim 14, wherein a first data quality test is defined for a first column of the read data, and a second data quality test is defined for a second column of the read data, wherein the first data quality test is different from the second data quality test.

16. The non-transitory computer-readable medium of claim 14, wherein the data quality test is selected from the group consisting of a test on a range of values, a test for a null value, a test for a predefined data type, a test for only digits, a test for only characters, a test for only alphanumeric characters, a test for only values in a list, and a test for only values in a table.

17. The non-transitory computer-readable medium of claim 1, wherein the computer-readable instructions further control the computing device to:

determine whether a data layout description file for the selected source file is stored in the predefined directory; and based upon determining that the data layout description file for the selected source file is stored in the predefined directory, read a data layout description from the data layout description file; and
read the data from the selected source file also using the read data layout description.

18. The non-transitory computer-readable medium of claim 17, wherein the computer-readable instructions further control the computing device to:
based upon determining that the data layout description file for the selected source file is not stored in the predefined directory,
read a common data layout description from a common data layout description file; and
read the data from the selected source file also using the read common data layout description.

19. The non-transitory computer-readable medium of claim 1, wherein, before automatically reading the data, the computer-readable instructions further control the computing device to automatically decompress the selected source file based on a compression indicator associated with the selected one parameter.

20. The non-transitory computer-readable medium of claim 1, wherein, before automatically reading the data, the computer-readable instructions further control the computing device to automatically decrypt the selected source file based on an encryption indicator associated with the selected one parameter.

21. The non-transitory computer-readable medium of claim 1, wherein the computer-readable instructions further control the computing device to:
automatically select a pre-process program based on a pre-process program indicator associated with the selected one parameter; and
automatically execute the selected pre-process program with the selected source file before automatically reading the data from the selected source file.

22. The non-transitory computer-readable medium of claim 1, wherein the computer-readable instructions further control the computing device to:
automatically select a post-process program based on a post-process program indicator associated with the selected one parameter; and
automatically execute the selected post-process program with the selected source file after determining whether the trigger file for the selected source file is stored in the predefined directory.

23. The non-transitory computer-readable medium of claim 1, wherein the read file indicator is selected from the group consisting of a file type indicator, a delimiter type indicator, a first observation indicator, an encryption indicator, a compression indicator, a partitioned file indicator, a field type indicator, a field format indicator, and a field length indicator.

24. The non-transitory computer-readable medium of claim 1, wherein the trigger file is identified based on a prefix of the filename of the selected source file and an extension specified by a trigger file extension indicator associated with the selected one parameter and read from the registry file.

25. The non-transitory computer-readable medium of claim 1, wherein the computer-readable instructions further control the computing device to:
automatically read a second registry file before automatically selecting the extract script when the filename of the selected source file does not match any matching filename pattern of the plurality of filename parameters,
wherein the second registry file includes a second plurality of filename parameters,
wherein each filename parameter of the second plurality of filename parameters identifies a second matching filename pattern,
wherein a second extract script indicator and a second read file indicator are associated with each filename parameter of the second plurality of filename parameters,
wherein the second extract script indicator indicates an extract script for a file having a filename that matches the second matching filename pattern,
wherein the second read file indicator indicates how to read the file having the filename that matches the second matching filename pattern; and
automatically select the one parameter of the second plurality of filename parameters read from the second registry file by matching the filename of the selected source file to the second matching filename pattern of the one parameter.

26. The non-transitory computer-readable medium of claim 1, wherein the registry file is selected based on a prefix of the filename of the selected source file.

27. The non-transitory computer-readable medium of claim 1, wherein the computer-readable instructions further control the computing device to:
based upon determining that the selected source file is not expected based on the time parameter, send the first error message to a predefined address.

28. The non-transitory computer-readable medium of claim 1, wherein the computer-readable instructions further control the computing device to,
when unprocessed source data is not stored in the predefined directory, determine whether an expected receipt time has expired; and
based upon determining that the expected receipt time has expired, send an error notification message to a predefined address.

29. A computing device comprising:
a processor; and
a non-transitory computer-readable medium operably coupled to the processor, the computer-readable medium having computer-readable instructions stored thereon that, when executed by the processor, control the computing device to
automatically read a registry file,
wherein the registry file includes a plurality of filename parameters,
wherein each filename parameter of the plurality of filename parameters identifies a matching filename pattern,
wherein an extract script indicator and a read file indicator are associated with each filename parameter,
wherein the extract script indicator indicates an extract script for a file having a filename that matches the matching filename pattern,
wherein the read file indicator indicates how to read the file having the filename that matches the matching filename pattern;
automatically determine whether unprocessed source data is stored in a predefined directory;
based upon determining that unprocessed source data is stored in the predefined directory,
automatically select a source file from the unprocessed source data;
automatically select one parameter of the plurality of filename parameters read from the registry file by matching a filename of the selected source file to the matching filename pattern of the one parameter;
determine whether the selected source file is expected based on a time parameter read from the registry file in association with the selected one parameter;
based upon determining that the selected source file is not expected based on the time parameter, update an error status file to include a first error message;
automatically select the extract script based on the extract script indicator associated with the selected one parameter;
automatically read data from the selected source file using the selected extract script and using the read file indicator associated with the selected one parameter; and
automatically output the read data to a different file than the source file;
determine whether a trigger file for the selected source file is stored in the predefined directory; and
based upon determining that the trigger file for the selected source file is stored in the predefined directory,
read the trigger file to define a data integrity test value for the selected source file;
perform an integrity test by comparing the defined data integrity test value to a test value determined from the read data;
determine whether the performed integrity test fails; and
based upon determining that the performed integrity test fails, update the error status file to include a second error message.

30. A method of automatically processing data received from a first computing device for use on a second computing device, the method comprising:
automatically reading, by a first computing device, a registry file,
wherein the registry file includes a plurality of filename parameters,
wherein each filename parameter of the plurality of filename parameters identifies a matching filename pattern,
wherein an extract script indicator and a read file indicator are associated with each filename parameter,
wherein the extract script indicator indicates an extract script for a file having a filename that matches the matching filename pattern,
wherein the read file indicator indicates how to read the file having the filename that matches the matching filename pattern;
automatically determining, by the first computing device, whether unprocessed source data is stored in a predefined directory;
based upon determining that unprocessed source data is stored in the predefined directory,
automatically selecting, by the first computing device, a source file from the unprocessed source data;
automatically selecting, by the first computing device, one parameter of the plurality of filename parameters read from the registry file by matching a filename of the selected source file to the matching filename pattern of the one parameter;
determining, by the first computing device, whether the selected source file is expected based on a time parameter read from the registry file in association with the selected one parameter;
based upon determining that the selected source file is not expected based on the time parameter, updating, by the first computing device, an error status file to include a first error message;
automatically selecting, by the first computing device, the extract script based on the extract script indicator associated with the selected one parameter;
automatically reading, by the first computing device, data from the selected source file using the selected extract script and using the read file indicator associated with the selected one parameter; and
automatically outputting, by the first computing device, the read data to a different file than the source file;
determining, by the first computing device, whether a trigger file for the selected source file is stored in the predefined directory; and
based upon determining that the trigger file for the selected source file is stored in the predefined directory,
reading, by the first computing device, the trigger file to define a data integrity test value for the selected source file;
performing, by the first computing device, an integrity test by comparing the defined data integrity test value to a test value determined from the read data;
determining, by the first computing device, whether the performed integrity test fails; and
based upon determining that the performed integrity test fails, updating, by the first computing device, the error status file to include a second error message.

* * * * *